United States Patent [19]

Tabata et al.

[11] Patent Number: 5,593,365
[45] Date of Patent: Jan. 14, 1997

[54] CONTROL SYSTEM FOR AUTOMATIC TRANSMISSION

[75] Inventors: Atsushi Tabata, Okazaki; Nobuyuki Takahashi; Takashi Ohta, both of Toyota; Yasuo Hojo, Nagoya; Shinji Kasuga; Masahiro Hayabuchi, both of Anjo; Masahiko Ando, Okazaki; Kazumasa Tsukamoto, Toyota; Akira Fukatsu, Anjo, all of Japan

[73] Assignees: Toyota Jidosha Kabushiki Kaisha, Toyota; Aishin A.W. Co., Ltd., Anjo, both of Japan

[21] Appl. No.: 509,456

[22] Filed: Jul. 31, 1995

[30] Foreign Application Priority Data

| Aug. 2, 1994 | [JP] | Japan | 6-200158 |
| Jun. 29, 1995 | [JP] | Japan | 7-186417 |
| Jun. 29, 1995 | [JP] | Japan | 7-186418 |

[51] Int. Cl.$^6$ ............... B60K 41/06; F16H 61/26; F16H 63/00
[52] U.S. Cl. .......................... 477/119; 477/908
[58] Field of Search ........................ 477/119, 908

[56] References Cited

U.S. PATENT DOCUMENTS

| 4,765,203 | 8/1988 | Sugano | 477/119 |
| 5,351,577 | 10/1994 | Ando et al. | 477/116 |

FOREIGN PATENT DOCUMENTS

| 0354003 | 2/1990 | European Pat. Off. |
| 0398344 | 11/1990 | European Pat. Off. |
| 56-134656 | 10/1981 | Japan |
| 5-157165 | 6/1993 | Japan |
| 6-13257 | 2/1994 | Japan |

Primary Examiner—Dirk Wright
Attorney, Agent, or Firm—Oblon, Spivak, McClelland, Maier & Neustadt

[57] ABSTRACT

A control system for an automatic transmission including a main transmission unit for setting a reverse stage and a plurality of forward stages and an auxiliary transmission unit connected in series to the main transmission unit and capable to be changed between two higher and lower stages. The control system comprises: a solenoid valve for outputting a signal pressure when at least the reverse stage and a predetermined one of the forward stages are to be set; a change-over valve for changing the signal pressure selectively into a signal pressure for setting the auxiliary transmission unit to a high gear stage and a signal pressure for controlling an engine braking state; and an engine braking control valve for controlling an engine braking frictional element at the predetermined forward stage into a released state in response to the signal pressure coming from the change-over valve. The acting state of the solenoid valve when the reverse stage is to be set and the acting state of the solenoid valve when the predetermined forward stage for making the engine braking ineffective is to be set are identical to each other.

21 Claims, 17 Drawing Sheets

FIG. 3

| POSITION | SOLENOID |  |  |  | CLUTCH |  |  |  | BRAKE |  |  |  |  | OWC |  |  |
|---|---|---|---|---|---|---|---|---|---|---|---|---|---|---|---|---|
|  | NO.1 | NO.2 | NO.3 | SLU | C-1 | C-2 | C-0 | B-1 | B-2 | B-3 | B-4 | B-0 | F-1 | F-2 | F-0 |
| P | ○ | × | ○ | × | × | × | ○ | × | × | × | × | × | × | × | × |
| R | ○ | × | × | × | × | ○ | × | × | × | × | ○ | ○ | × | × | × |
| N | ④ | × | × | × | × | × | ○① | × | × | × | × | ○② | × | × | × |
| D 1ST | ○ | × | × | × | ○ | × | ○ | × | × | × | × | × | × | × | ○ |
| D 2ND | ○ | ○ | × | ○ | ○ | × | ○ | × | × | ○ | × | × | × | ○ | ○ |
| D 3RD | × | ○ | × | ◎ | ○ | × | ○ | × | ○ | × | × | × | ○ | × | ○ |
| D 4TH | × | × | × | ◎ | ○ | ○ | ○ | × | ○ | × | × | × | × | × | ○ |
| D 5TH | × | × | ○ | × | × | ○ | ○ | × | ○ | × | × | × | × | × | ○ |
| 3 1ST | ○ | × | × | × | ○ | × | ○ | × | × | × | × | × | × | × | ○ |
| 3 2ND | ○ | ○ | × | ○ | ○ | × | ○ | × | × | ○ | × | × | × | ○ | ○ |
| 3 3RD E/G BRAKE | × | ○ | × | ◎ | ○ | × | ○ | × | ○ | × | × | × | × | × | ○ |
| 3 4TH | × | × | × | ◎ | ○ | ○ | ○ | × | ○ | × | × | × | × | × | ○ |
| 2 1ST | ○ | × | × | × | ○ | × | ○ | × | × | × | × | × | × | × | ○ |
| 2 2ND E/G BRAKE | ○ | ○ | × | ◎ | ○ | × | ○ | × | ○ | ○ | × | × | × | × | ○ |
| 2 3RD E/G BRAKE | × | ○ | × | ◎ | ○ | × | ○ | × | ○ | × | × | × | × | × | ○ |
| (L) 1ST E/G BRAKE | ○ | × | × | × | ○ | × | ○ | ○ | × | × | × | × | × | × | ○ |
| (L) 2ND E/G BRAKE | ○ | ○ | × | ○ | ○ | × | ○ | ○ | × | ○ | × | × | × | × | ○ |
| P·N (N) | ○ | × | × | × | × | × | ○ | × | × | × | × | ○ | × | × | × |
| R (R) | × | × | × | × | × | ○ | × | × | × | × | ○ | ○ | × | × | × |
| D (5TH) | × | × | ○ | × | × | ○ | ○ | × | ○ | × | × | × | × | × | ○ |
| 3 (4TH) | × | × | × | × | ○ | ○ | ○ | × | ○ | × | × | × | × | × | ○ |
| 2 (3RD) | × | × | × | × | ○ | × | ○ | × | ○ | × | × | × | × | × | ○ |
| (L) (1ST) | ○ | × | × | × | ○ | × | ○ | ○ | × | × | × | × | × | × | ○ |
| ENSURE GEAR STAGE WITH ALL SOLENOIDS OFF | | | | | | | | | | | | | | | |
| 1→2 GEAR CHANGE | ○ | ○ | × | ×→○ | ○ | × | ○ | × | × | ×→○ | × | × | × | ×→○ | ○ |
| 2→1 GEAR CHANGE | ○ | ○ | × | ○→× | ○ | × | ○ | × | × | ○→× | × | × | × | ○→× | ○ |
| 2→3 GEAR CHANGE | × | ○ | × | ● | ○ | × | ○ | × | ×→○ | ○→× | × | × | ×→○ | ○→× | ○ |
| 3→2 GEAR CHANGE | ○ | ○→× | × | ○→× | ○ | × | ○ | × | ○→× | ×→○ | × | × | ○→× | ×→○ | ○ |
| R→D SHIFT | ○ | × | × | ○ | ○ | × | ○ | × | × | × | × | × | × | × | ○ |

①: 1ST ~ 4TH  ②: 5TH
④ SET SOL PATTERN OF D-RANGE ACCORDING TO VEHICLE SPEED

FIG.12

| POSITION | | SOLENOID | | | | CLUTCH | | | BRAKE | | | | | OWC | | |
|---|---|---|---|---|---|---|---|---|---|---|---|---|---|---|---|---|
| | | NO.1 | NO.2 | NO.3 | SLU | C-1 | C-2 | C-0 | B-1 | B-2 | B-3 | B-4 | B-0 | F-1 | F-2 | F-0 |
| P | HIGH SPEED | O | X | O | X | X | X | O | X | X | X | X | O | X | X | X |
| | LOW SPEED | X | X | X | X | X | X | O | X | X | X | O | O | X | X | X |
| R | | O④ | X | X | X | X | O | O | X | X | X | O | O | X | X | X |
| N | | ④ | X | X | X | X | X | O① | X | X | X | X | O② | X | X | X |
| D | 1ST | O | X | X | X | O | X | O | X | X | X | X | O | X | X | O |
| | 2ND | O | O | X | O | O | X | O | X | O | X | X | O | X | O | O |
| | 3RD | X | O | X | ⊚ | O | X | O | X | X | O | X | O | O | X | O |
| | 4TH | X | X | X | ⊚ | O | O | O | X | X | X | X | O | X | X | O |
| | 5TH | X | O | X | ⊚ | X | O | X | X | X | O | X | X | X | X | O |
| 3 | 1ST | O | X | X | X | O | X | O | X | X | X | X | O | X | X | O |
| | 2ND | O | O | X | O | O | X | O | X | O | X | X | O | X | O | O |
| | 3RD E/G BRAKE | X | O | X | ⊚ | O | X | O | O | X | O | X | O | X | X | O |
| | 4TH | X | X | X | ⊚ | O | O | O | X | X | X | X | O | X | X | O |
| 2 | 1ST | O | X | X | X | O | X | O | X | X | X | X | O | X | X | O |
| | 2ND E/G BRAKE | O | O | X | O | O | X | O | O | O | X | X | O | X | O | O |
| | 3RD E/G BRAKE | X | O | X | ⊚ | O | X | O | O | X | O | X | O | X | X | O |
| (L) | 1ST E/G BRAKE | O | X | X | X | O | X | O | X | X | X | O | O | X | X | O |
| | 2ND E/G BRAKE | O | O | X | O | O | X | O | O | O | X | X | O | X | O | O |
| ENSURE GEAR STAGE WITH ALL SOLENOIDS OFF | | | | | | | | | | | | | | | | |
| P-N | (N) | X | X | X | X | X | X | O | X | X | X | X | O | X | X | O |
| R | (R) | X | X | X | X | X | O | O | X | X | X | O | O | X | X | O |
| D | (5TH) | X | X | X | X | X | O | X | X | X | O | X | X | X | X | O |
| 3 | (4TH) | X | X | X | X | O | O | O | X | X | X | X | O | X | X | O |
| 2 | (3RD) | X | X | X | X | O | X | O | O | X | O | X | O | X | X | O |
| (L) | (1ST) | X | X | X | X | O | X | O | X | X | X | O | O | X | X | O |
| 1→2 GEAR CHANGE | | O | X | X | X→O | O | X | O | X | X→O | O | X | O | X | X→O | O |
| 2→1 GEAR CHANGE | | O | X→O | X | O→X | O | X | O | X | O→X | X | X | O | X | O→X | O |
| 2→3 GEAR CHANGE | | X | O | X | ● | O | X | O | X | O→X | X→O | X | O | X→O | O→X | O |
| 3→2 GEAR CHANGE | | O→X | O | X | O→X | O | X | O | X | X→O | O→X | X | O | X→O | X→O | O |
| R→D SHIFT | | O | X | X | X | X | O→X | O | X | X | X | X→O | O→X | X | X | O |

①: 1ST～4TH　　②: 5TH
④: SET SOL PATTERN OF D-RANGE ACCORDING TO VEHICLE SPEED

CONTROL SYSTEM FOR AUTOMATIC TRANSMISSION

BACKGROUND OF THE INVENTION

The present invention relates to a control system for an automatic transmission of a vehicle and, more particularly, to a control system for an automatic transmission, which is equipped with an auxiliary transmission unit capable of changing two high and low stages and adapted to be set to the high gear stage at a reverse stage.

In an automatic transmission of a vehicle, there is frequently used an overdrive system for improving the fuel economy and the calmness, as is well known in the art. On example is disclosed in Japanese Patent Laid-Open No. 157165/1993, in which an overdrive system including a set of planetary gear mechanism is disposed at the input side of a main transmission unit for setting forward four and reverse one stages. This overdrive system is constructed to set a low gear stage (or a directly connected stage), in which the entirety makes one rotation, by connecting the carrier and the sun gear of the planetary gear mechanism through a clutch, and to set a high gear stage by fixing the sun gear through a brake. In the automatic transmission disclosed in the above-specified Laid-Open, moreover, the overdrive system is set to the high gear stage not only for setting the highest gear stage, i.e., the 5th speed but also for setting the reverse stage, so that the reverse stage may be prevented from taking a high gear ratio.

After all, the automatic transmission, as disclosed in the above-specified Laid-Open, can set forward five and reverse one stages and is equipped therefore with first to third solenoid valves for controlling the shift. As in the ordinary automatic transmission, moreover, the engine braking is required for the 1st or 3rd speed. For this requirement, the aforementioned automatic transmission is further equipped with a fourth solenoid valve for feeding a signal pressure to a predetermined change-over valve to set the engine braking state selectively.

In order to set the individual gear stages in the drive range and in the engine braking range, the aforementioned control system for the automatic transmission of the prior art is equipped with the first to fourth four solenoid valves. For the entire compactness of the hydraulic control system or the automatic transmission, however, it is desirable to reduce the number of solenoid valves. In this case, the high gear stage of the overdrive system is set at the 5th speed and the reverse stage, whereas the engine braking state is set at the gear stages of the 1st speed and the 3rd speed. It is, therefore, conceivable to commonly use the solenoid valves which are used at the gear stage having no mutual interference, as called so. Specifically, it is conceivable to cause the solenoid valves for setting the overdrive system to the high gear stage to set the engine braking at the gear stages such as the 1st speed or the 3rd speed in the engine braking range.

In case, however, the solenoid valve for the so-called "overdrive" is used commonly as the solenoid valve for the engine braking, no engine braking is effected at the 1st speed in the drive (D) range. Thus, the acting states of the solenoid valve are reversed at the reverse stage setting time and at the 1st speed of the D-range. Specifically, this solenoid valve is a valve for changing the overdrive system to the high gear stage and is usually constructed to output a signal pressure, when in a deenergized (OFF) state, from the standpoint of a fail-safe operation for setting a high gear stage at the time of a failure. Hence, the solenoid valve is turned OFF, when the reverse stage is set, but ON to output no signal pressure at the 1st speed of the D-range, in which the engine braking is ineffective.

Thus, if the aforementioned solenoid valve is simply used commonly for setting the overdrive and for the engine braking, the energization patterns for the solenoid valve are reversed between the reverse stage and the D-range. As a result, in case the detection signal of the reverse stage (i.e., the R-range) is outputted by an electric failure although the 1st speed of the D-range is set, the aforementioned solenoid valve is turned OFF to output the signal pressure so that the engine braking is effective at the 1st speed of the D-range. Specifically, a multi-disc brake in parallel with a one-way clutch to be applied at the 1st speed is applied so that the shift cannot be smoothly executed to deteriorate the shift shock, or the braking state may be invited as soon as the accelerator pedal is released, to deteriorate the drive feeling.

SUMMARY OF THE INVENTION

A main object of the present invention is to provide a control system for an automatic transmission, which has its size and weight reduced by making the solenoid valves common while giving no disorder to the driver.

Another object of the present invention is to provide a control system capable of preventing any shift at the reverse stage even if the range decision fails.

Still another object of the present invention is to provide a control system which can easily control the start.

According to the present invention, there is provided a control system for an automatic transmission including a main transmission unit for setting a reverse stage and a plurality of forward stages and an auxiliary transmission unit connected in series to transmit the power directly to the main transmission unit and capable to be changed between two higher and lower stages. The control system comprises: a solenoid valve for outputting a signal pressure when at least the reverse stage and a predetermined one of the forward stages are to be set; a change-over valve for changing the signal pressure selectively into a signal pressure for setting the auxiliary transmission unit to a high gear stage and a signal pressure for controlling an engine braking state; and an engine braking control valve for controlling an engine braking frictional element at the predetermined forward stage into a released state in response to the signal pressure coming from the change-over valve. The acting state of the solenoid valve when the reverse stage is to be set and the acting state of the solenoid valve when the predetermined forward stage for making the engine braking ineffective is to be set are identical to each other.

Even if an electrical failure occurs to decide the ranges for setting the reverse stage and the predetermined forward stage, therefore, no change arises in the acting states of the solenoid valve for controlling the auxiliary transmission unit thereby to eliminate the trouble that the auxiliary transmission unit takes the low gear stage at the reverse stage or that the engine braking is effected at the predetermined forward stage.

According to the present invention, moreover, the acting state of the solenoid valve for controlling the shift is held at the acting state for setting the 1st speed of the drive range or is made identical to the acting state for setting the forward stage to be set by setting the auxiliary transmission unit to the high gear stage in case the vehicle speed reaches a predetermined value.

As a result, even if the reverse stage is electrically decided as the drive range to execute the shift control in the drive range, the acting state of the solenoid valve to be set is one for setting the auxiliary transmission unit to the high gear stage thereby to cause no shift in which the auxiliary transmission unit is changed to the low gear stage while the vehicle is running at the reverse stage.

In the control system of the present invention, furthermore, the change-over valve is caused in the neutral range to change the signal pressure coming from the solenoid valve into the signal pressure for controlling the engine braking state and to output the changed signal pressure.

In case, therefore, the vehicle is started to run at the predetermined forward stage, the auxiliary transmission unit is left at the low gear stage to establish no shift. As a result, the start control is facilitated.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

BRIEF DESCRIPTION OF THE DRAWINGS

FIG. 3 is a chart showing the ON/OFF states of solenoid valves and the applied/released states of frictional elements in individual running ranges and at individual gear stages;

FIG. 9 is a diagram showing an arrangement of individual range positions in a shift unit;

FIG. 12 is a chart showing the ON/OFF states of solenoid valves and the applied/released states of frictional elements in individual running ranges and at individual gear stages in accordance with another embodiment;

DESCRIPTION OF THE PREFERRED EMBODIMENTS

Figure 1:
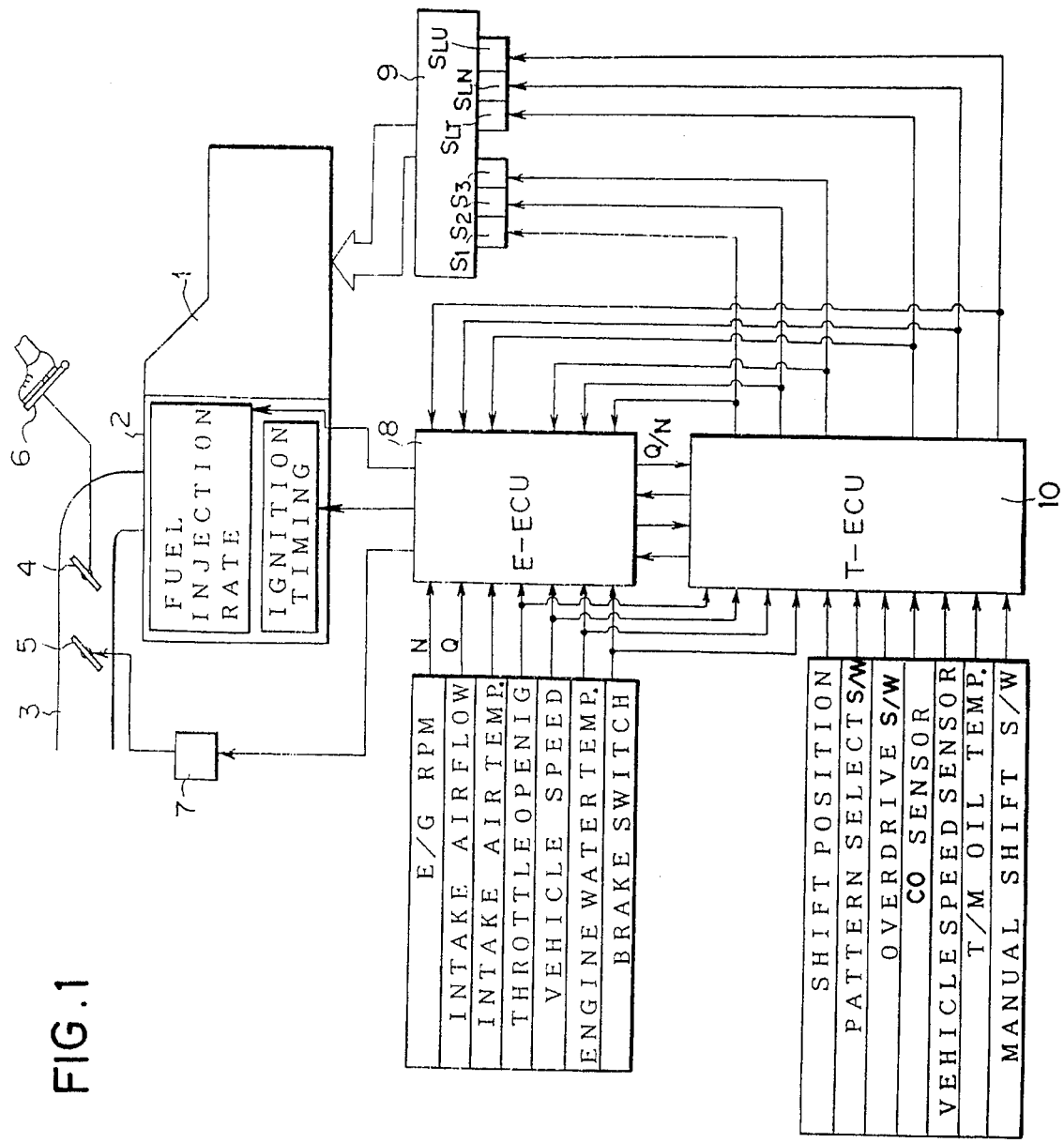
FIG. 1 is a block diagram schematically showing one embodiment of the present invention.

The present invention will be specifically described in connection with its embodiments. FIG. 1 schematically shows one embodiment Of the present invention. An engine 2 is connected to an automatic transmission and is equipped in its intake pipe 3 with a main throttle valve 4 and a sub-throttle valve 5, as located upstream of the main throttle valve 4. This main throttle valve 4 is connected to an accelerator pedal 6 so that it is opened/closed according to the depression of the accelerator pedal 6. On the other hand, the sub-throttle valve 5 is opened/closed by a motor 7. In order to control the motor 7 for adjusting the opening of the sub-throttle valve 5 and to control the fuel injection rate and ignition timing of the engine 2, there is provided an engine-electronic control unit (E-ECU) 8. This electronic control unit 8 is mainly composed of a central processing unit (CPU), memories (RAM, ROM) and an input/output interface. To this electronic control unit 8, there are inputted, as control data, a variety of signals including an engine (E/G) RPM N, an intake air flow Q, an intake air temperature, a throttle opening, a vehicle speed, an engine water temperature and a signal from a brake switch. A shift, a lockup clutch and a line pressure in the automatic transmission 1 are controlled by a hydraulic control unit 9. This hydraulic control unit 9 is so constructed that it may be electrically controlled, and is equipped with first to third shift solenoid valves S1 to S3 for executing a shift, a linear solenoid valve SLT for controlling the line pressure, a linear solenoid valve SLN for controlling an accumulator back pressure, and a linear solenoid valve SLU for controlling the lockup clutch.

There is also provided a transmission-electronic control unit (T-ECU) 10 for outputting signals to those solenoid valves to control the shift, the line pressure and/or the accumulator back pressure. This transmission-electronic control unit 10 is mainly composed of a central processing unit (CPU), memories (RAM, ROM) and an input/output interface. To this electronic control unit 10, there are inputted control data including the throttle opening, the vehicle speed, the engine water temperature, the signal from the brake switch, shift position signals from a set of later-described switches of a shift unit, a signal from a pattern select switch, a signal from an overdrive switch, a signal from a C0 sensor for detecting the RPM of a later-described clutch C0, an oil temperature of the automatic transmission and a signal from a manual shift switch. Moreover, this transmission-electronic control unit 10 and the engine-electronic control unit 8 are connected with each other to effect interactive data communications, so that the engine-electronic control unit 8 sends the signals such as the intake air flow (Q/N) per rotation to the transmission-electronic control unit 10 whereas the transmission electronic control unit 10 sends a signal equivalent to the instruction signal for each solenoid valve and a signal instructing a gear stage to the engine-electronic control unit 8.

Specifically, the transmission-electronic control unit 10 decides the gear stage on the basis of a shift map, which is stored in advance with input data, the ON/OFF of the lockup clutch, outputs an instruction signal to a predetermined solenoid valve on the basis of the decision result, decides a failure, and makes controls on the basis of those decisions. On the other hand, the engine-electronic control unit 8 not only controls the injection rate, the ignition timing or the opening of the sub-throttle valve 5 on the basis of the inputted data but also lowers the output torque temporarily by reducing the fuel injection rate, changing the ignition timing or reducing the opening of the sub-throttle valve 5 at a shifting time in the automatic transmission 1.

Figure 2:
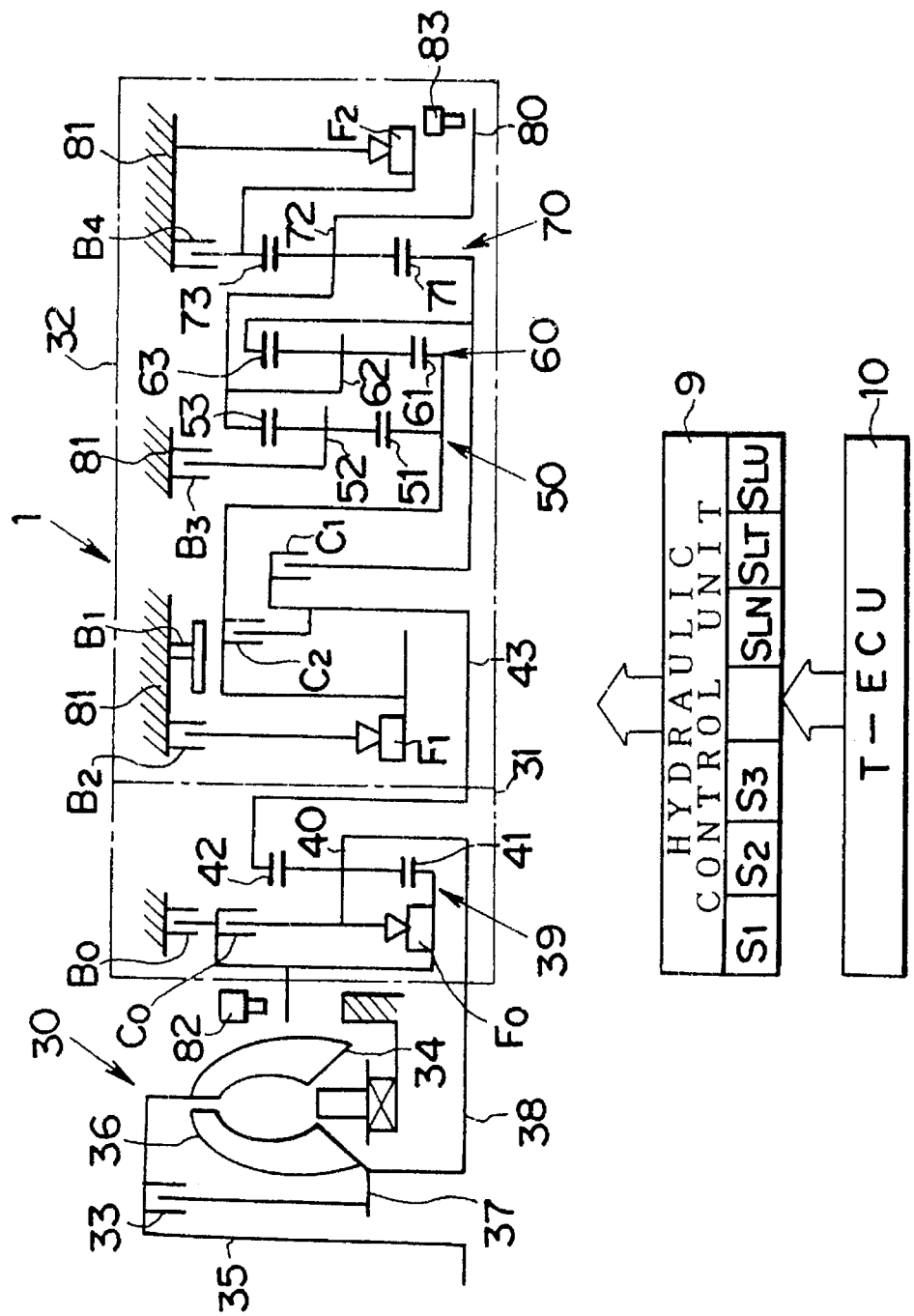
FIG. 2 is a skeleton diagram mainly showing a gear transmission mechanism of an automatic transmission to which is applied the present invention.

FIG. 2 is a diagram showing one example of the gear train of the aforementioned automatic transmission 1. In this example, the gear train is constructed to set gear stages of forward five and rear one stages. Specifically, the automatic transmission 1, as disclosed herein, is equipped with a torque converter 30, an auxiliary transmission unit 31 and a main transmission unit 32. The torque converter 30 has a lockup clutch 33 interposed between a front cover 35 unified with a pump impeller 34 and a member (or hub) 37 carrying a turbine runner 36 integrally therewith. The crankshaft of the engine (neither of which is shown) is connected to the front cover 35, and an input shaft having the turbine runner connected thereto is connected to a carrier 40 of an overdrive planetary gear mechanism 39 constituting the auxiliary transmission unit 31.

In this planetary gear mechanism 39 between the carrier 40 and a sun gear 41, there are interposed a multi-disc clutch C0 and a one-way clutch F0. Incidentally, this one-way clutch F0 is applied in case the sun gear 41 rotates forward (i.e., in the rotating direction of the input shaft 38) relative to the carrier 40. A multi-disc brake B0 is also provided for stopping the rotation of the sun gear 41 selectively. Moreover, a ring gear 42 acting as the output element of the auxiliary transmission unit 31 is connected to an intermediate shaft 43 acting as the input element of the main transmission unit 32.

As a result, with the multi-disc clutch C0 or the one-way clutch F0 being applied in the auxiliary transmission unit 31, the planetary gear mechanism 39 rotates as a whole so that the intermediate shaft 43 rotates at the same speed as the input shaft 38 so that a low gear stage is established. With the brake B0 being applied to stop the rotation of the sun gear 41, on the contrary, the ring gear 42 is accelerated in the forward direction with respect to the input shaft 38 so that a high gear stage is established.

On the other hand, the main transmission unit 32 is equipped with three sets of planetary gear mechanisms 50, 60 and 70 which have their rotational elements connected, as follows. Specifically, the sun gear 51 of the first planetary gear mechanism 50 and the sun gear 61 of the second planetary gear mechanism 60 are integrally connected to each other. Moreover, ring gear 53 of the first planetary gear mechanism 50, the carrier 62 of the second planetary gear mechanism 60, and the carrier 72 of the third planetary gear mechanism 70 are connected to one another. Still moreover, the second planetary gear mechanism 60 has its ring gear 63 connected to the sun gear 71 of the third planetary gear mechanism 70.

This gear train of the main transmission unit is enabled to set the reverse gear stage and the forward four gear stages by clutches and brakes, as described in the following. A first description will be made on the clutches. A first clutch C1 is interposed between the ring gear 63 of the second planetary gear mechanism 60 and the sun gear 71 of the third planetary gear mechanism 70, as connected to each other, and the intermediate shaft, and a second clutch C2 is interposed between the sun gear 51 of the first planetary gear mechanism 50 and the sun gear 61 of the second planetary gear mechanism 60, as connected to each other, and the intermediate shaft 43.

Here will be described the brakes. Of these, a first brake B1 is a band brake which is arranged for stopping the rotations of the sun gears 51 and 61 of the first planetary gear mechanism 50 and the second planetary gear mechanism 60. Between these sun gears 51 and 61 (i.e., the common sun gear shaft) and a casing 81, moreover, there are arrayed in series a first one-way clutch F1 and a second brake B2 or a multi-disc brake, of which the first one-way clutch F1 is applied when the sun gears 51 and 61 rotate backward (in the opposite direction to the rotating direction of the input shaft 38). A third brake B3 or a multi-disc brake is interposed between the carrier 52 of the first planetary gear mechanism 50 and the casing 81. Moreover, a fourth brake B4 acting as a multi-disc brake for stopping the rotation of the ring gear 73 of the third planetary gear mechanism 70 and a second one-way clutch F2 are arranged in parallel between the ring gear 73 and the casing 81. Incidentally, the second one-way clutch F2 is applied when the ring gear 73 rotates backward.

Of the rotating members of the aforementioned individual transmission units 31 and 32, the clutch C0 of the auxiliary transmission unit 31 is detected by a C0 sensor 82, and the RPM of the output shaft 80 is detected by a vehicle speed sensor 83.

In the automatic transmission 1 thus far described, the forward five and reverse one gear stages can be set by applying/releasing the individual clutches and brakes, as tabulated in the chart of FIG. 3. Incidentally, in FIG. 3: a symbol o indicates the ON or applied state; a symbol × indicates the OFF or released state; a symbol ⊙ indicates the ON control state of the lockup clutch; and a symbol ● indicates the duty control during a shift.

Figure 4:
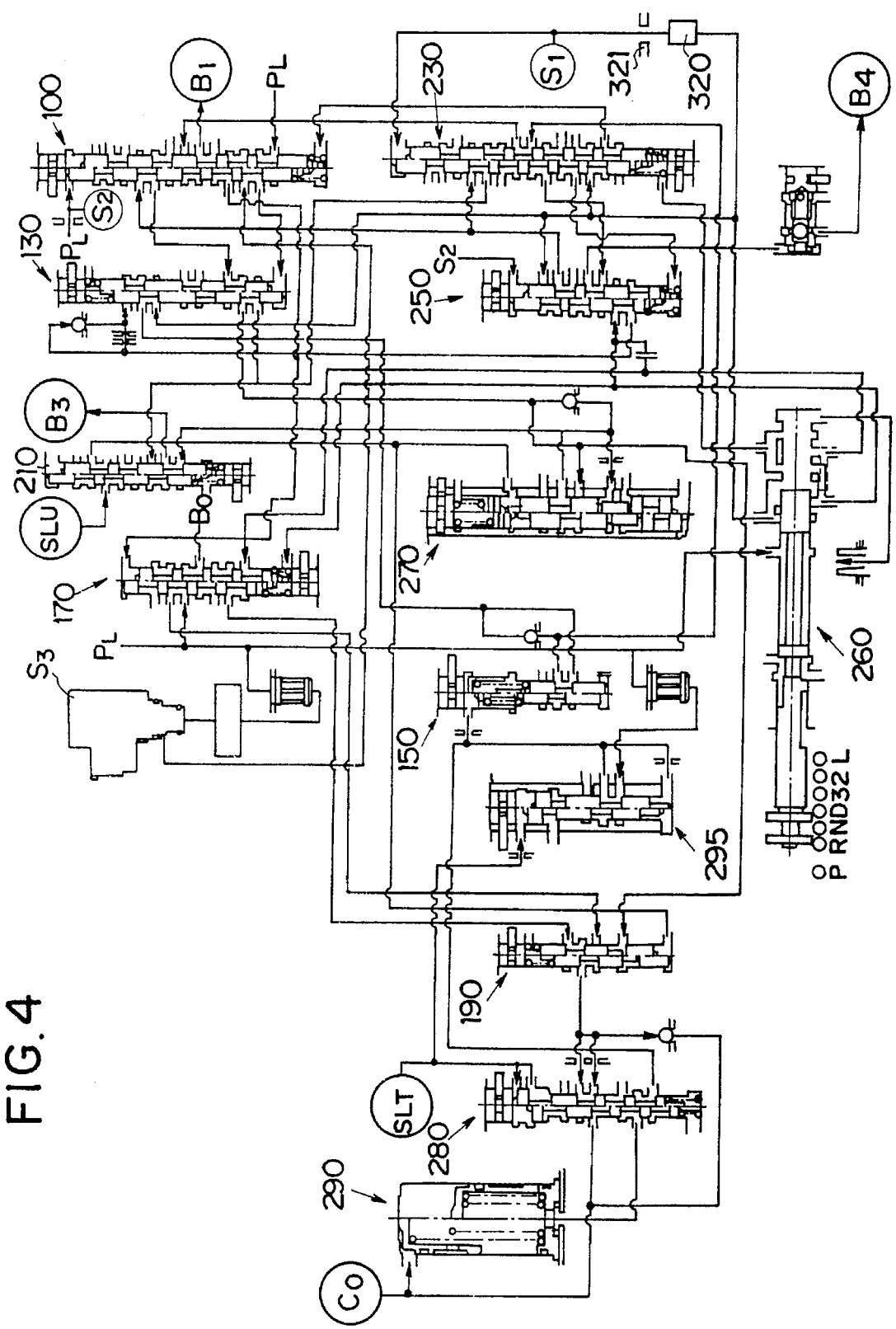
FIG. 4 is diagram showing a principal portion of the hydraulic circuit of one embodiment of the present invention.

As tabulated in the chart of FIG. 3, the control for changing the auxiliary transmission unit 31 between the overdrive state and the directly connected state and the control for effecting the engine braking at the 1st speed and the 3rd speed are executed by the third solenoid valve S3. For these controls, there is provided a hydraulic circuit, as shown in FIG. 4. FIG. 4 shows only the principal portion relating to the present invention, the more characteristic portion of which is schematically shown in FIG. 5.

The third solenoid valve S3 is a normal open type valve for using a line pressure PL as its initial pressure to output a signal pressure when in its OFF state. This third solenoid valve S3 is provided mainly for switching the auxiliary transmission unit 31 and is appropriated, when in the construction shown in FIGS. 4 and 5, for controlling the engine braking at the 1st and 3rd speeds. More specifically, the third solenoid valve S3 is turned OFF to output a signal pressure (or pilot pressure) not only at the 5th speed for setting the auxiliary transmission unit 31 to the overdrive state and at the reverse stage but also at the 1st speed and the 3rd speed in the drive (D) range. At these 1st speed and the 3rd speed in the D-range, however, the signal pressure of the third solenoid valve S3 is inverted, as called so, to cut off the feed of the oil pressure to the brakes B1 and B4 for effecting the engine braking at the 1st speed or the 3rd speed.

Figure 5:
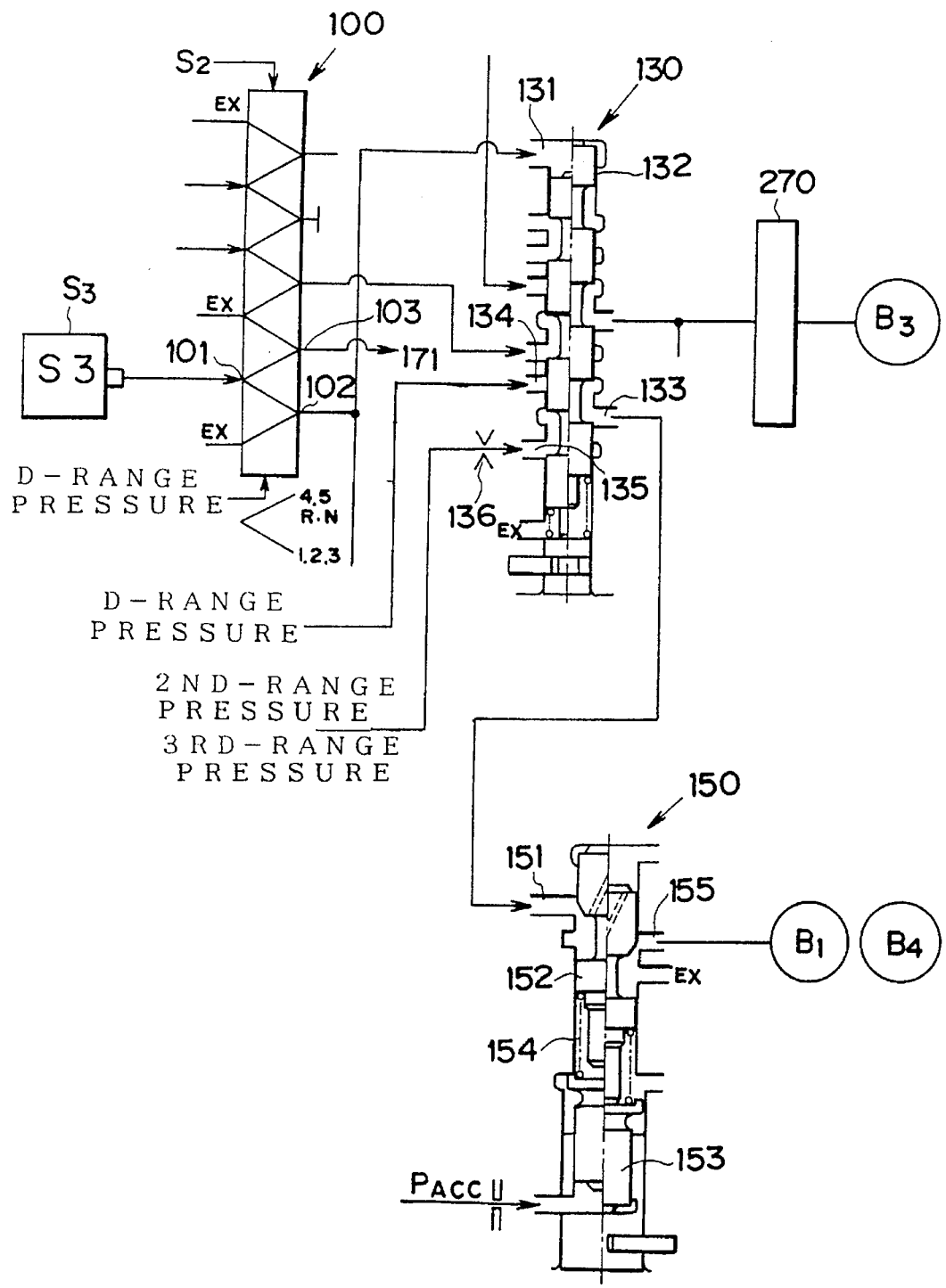
FIG. 5 is a partial hydraulic circuit schematically showing the principal hydraulic circuit according to the present invention.

In FIG. 5, more specifically, a 3–4 shift valve 100 is a spool valve having its individual ports opened for communications in the individual ranges and at the individual gear stages, as indicated at symbols in the lower portions of FIG. 5, and has its port 101 connected to the third solenoid valve S3. This port 101 is opened to communicate with a port 102 in the neutral (N) range and at the 1st to 3rd speeds, to send the signal pressure from the port 102 to a control port 131 of the B2 release control valve 130. Moreover, the port 101 is opened at the 4th and 5th speeds, in the R-range and in the N-range to communicate with a port 103, from which is fed the signal pressure to a 4–5 shift valve 170. In short, the 3–4 shift valve 100 outputs the signal pressure of the third solenoid valve S in a changing manner to the engine brake control line and the overdrive control line.

The B2 release control valve 130 is equipped with a spool 132 having four lands. This spool 132 is lowered to the position, as indicated at the lefthand half of FIG. 5, when the signal pressure is fed to the control port 131, and is raised to the position, as indicated at the right-hand half of FIG. 5, when the pressure is released from the control port 131. Across an engine braking pressure output port 133 of the ports of the B2 release control valve 130, there are formed a D-range pressure input port 134 and an engine braking range pressure input port 135. When the signal pressure of the third solenoid valve S3 is applied to the control port 131 so that the spool 132 takes the position, as indicated at the lefthand half of FIG. 5, the engine braking range pressure input port 135 communicates with the engine braking pressure output port 133.

On the other hand, when the signal pressure of the third solenoid valve S3 is not applied to the control port 131 so that the spool 132 takes the position, as indicated at the righthand half of FIG. 5, the D-range pressure input port 134 communicates with the engine brake pressure output port 133. Incidentally, the third solenoid valve S3 is turned OFF at the 1st to 3rd speeds in the D-range to output the signal pressure. In this case, the D-range pressure input port 134 is closed, and the engine braking range pressure is not built up in the D-range so that no oil pressure is outputted from the engine brake pressure output port 133.

This engine braking pressure output port 133 is connected to an input port 151 of a coast brake control valve 150. This coast brake control valve 150 is a valve for regulating and outputting an input oil pressure and is equipped with a spool 152 having two lands, a plunger 153 arranged at one end side of the spool 152, and a spring 154 arranged between the spool 152 and the plunger 153. Moreover, the land at the side of the input port 151 is formed with a through hole opened in the two end faces thereof to exert the output pressure on the end face of the spool 152. On the other hand, the plunger 153 is fed at its end portion with an accumulator back pressure control pressure PACC thereby to change the pressure regulating level. From an output port 155 to be selectively opened to the input port 151, moreover, there is outputted the oil pressure to the first brake B1 or the fourth brake B4 acting as the frictional element for the engine braking at the 1st speed or the 3rd speed.

Specifically, at the 1st and 3rd speeds in the D-range for building up the D-range pressure, this D-range pressure is cut off by the B2 release control valve 130 even if the third solenoid valve S3 is turned OFF to output the signal pressure. As a result, the first brake B1 or the fourth brake B4 is not fed with any oil pressure so that it is released to effect no engine braking. In short, the third solenoid valve S3 is inverted, as called so.

In the L-range in which the engine braking is effected at the 1st speed, on the other hand, the third solenoid valve S3 is turned ON to output no signal pressure so that the spool 132 of the B2 release control valve 130 is raised to the position, as indicated at the righthand half of FIG. 5. As a result, the D-range pressure input port 134 and output port 133 are opened to communicate so that the D-range pressure is sent to apply the fourth brake B4. Incidentally, this D-range pressure is built up in all the forward ranges. In either the "3"-range for effecting the engine braking at the 3rd speed or "2"-range, too, the third solenoid valve S3 is turned ON so that the first brake B1 can be fed with the oil pressure through the coast brake control valve 150 and applied to effect the engine braking as in the case of the 1st speed in the aforementioned L-range.

In case the third solenoid valve S3 is turned OFF by failure in the D-range, on the other hand, the B2 release control valve 130 has its D-range pressure input port 134 closed so that no engine braking can be effected to prevent the shifting shock.

In the case of the so-called "valve stick", moreover, in which the B2 release control valve 130 has its spool 132 fixed in the position, as indicated at the righthand half of FIG. 5, the engine braking pressure input port 135 and output port 133 are opened at all times to communicate with each other. As a result, in the engine braking range such as the "3"-range or the "2"-range, the oil pressure can be outputted from the output port 133 so that the first brake B1 can be applied to effect the engine braking at the 3rd speed.

Incidentally, the oil line communicating with the engine braking pressure input port 135 is formed with an orifice 136 for avoiding the interference between the first brake B1 and the second brake B2. In case the first brake B1 is to be applied at the 3rd speed, the rate of feeding the oil pressure is delayed by the orifice 136 so that the application of the second brake B2 may precede.

Here will be more specifically described the hydraulic circuit shown in FIG. 4. This description will be made with reference to FIGS. 6 to 8 which are divided from FIG. 4 for drawing conveniences.

Figure 6:
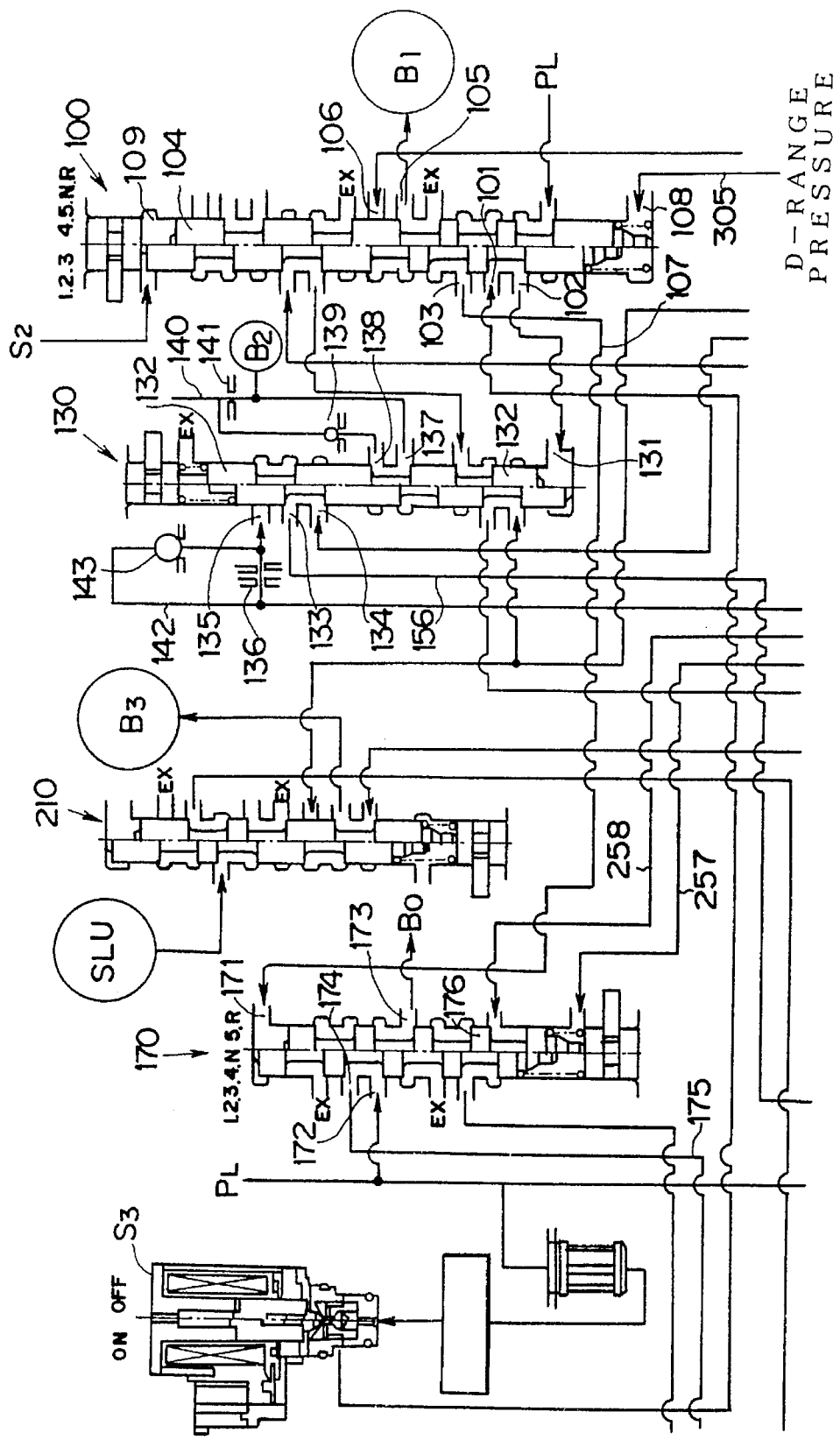

First of all, the B2 release control valve 130 will be described in the following. In FIG. 6, the B2 release control valve 130 is inverted from that of FIG. 5. In addition to the aforementioned individual connected states of the individual ports, the second brake B2 is connected to a B2 port 137, and an oil line 140 is connected through an orifice having a check ball to a port 138 which is selectively opened to communicate with that B2 port 137. Moreover, the second brake B2 is given its communication with that oil line 140 through an orifice 141. By providing the communication with the B2 port 137 with the port 138, therefore, the second brake B2 is given its communication with the oil line 140 through not only the orifice 141 but also the check ball orifice 139 so that its pressure releasing rate is increased. Thus, the B2 release control valve 130 is constructed to change the rate of releasing the pressure from the second brake B2, i.e., the releasing rate of the second brake B2 by applying or releasing the signal pressure of the third solenoid valve S3 to or from the control port 131.

On the other hand, an oil line 142 connected to the engine braking range pressure input port 135 is equipped with not only the aforementioned orifice (or double orifice) 136 but also such an orifice 143 having a check ball in parallel with the double orifice 136 as is opened in the pressure releasing direction. Moreover, the oil line 142 is connected to the later-described 1–2 shift valve. Here will be described the 3–4 shift valve 100. A spool 104 for changing the communications of the aforementioned ports 101, 102 and 103 has six lands, and the first brake B1 is connected with a brake port 105 which is formed in an intermediate portion. Moreover, an input port 106 adjacent to the brake port 105 is opened to communicate with the coast brake control valve 150 through the later-described 2–3 shift valve. The aforementioned port 103 is opened to communicate with the control port 171 of the 4–5 shift valve 170 via an oil line 107.

Moreover, the 3–4 shift valve 100 is actuated by the signal pressure outputted from the second solenoid valve S2 and by the later-described D-range pressure. Specifically, the D-range pressure is fed to a hold port 108 which is opened into the spring chamber, and the second solenoid valve S2 is connected with a control port 109 which is opposed to the hold port 108 across the spool 104. Incidentally, this second solenoid valve S3 is a normal closed type solenoid valve which employs the line pressure PL as its initial pressure so that it is turned OFF to output the signal pressure and ON to cut off the output of the signal pressure. On the other hand, the 4–5 shift valve 170 is a valve for controlling the aforementioned auxiliary transmission unit 31 into the overdrive state (at a high gear stage) or the directly connected state (at a low gear stage) and is constructed to change the communicating states of the ports by a spool 176 having five lands. The brake B0 in the auxiliary transmission unit 31 is connected with such one 173 of those ports as is selectively opened to communicate with an input port 172 connected with the line pressure line PL. On the other hand, an output port 174, as opposed to the aforementioned brake port 173 with respect to the input port 172, is connected to a C0 exhaust valve 190 via an oil line 175.

As a result, when the signal pressure of the third solenoid valve S33 is applied via the oil line 107 to the control port 171, the spool 176 is lowered to the position, as indicated at the righthand half of FIG. 6, so that the input port 172 is opened to communicate with the brake port 173 thereby feed the oil pressure to the brake B0. When the pressure is released from the control port 171, on the contrary, the spool 176 is raised to the position, as indicated at the lefthand half of FIG. 6. As a result, the input port 172 takes communication with the output port 174 to feed the oil pressure to the C0 exhaust valve 190 thereby to apply the clutch C0. Incidentally, reference numeral 210 appearing in FIG. 6 designates a solenoid relay valve which is constructed to control the application/release of the signal pressure from the lockup linear solenoid valve SLU and the application/release of the oil pressure to the third brake B3. Incidentally, the connected states of the remaining oil lines are shown in FIG. 4.

Figure 7:
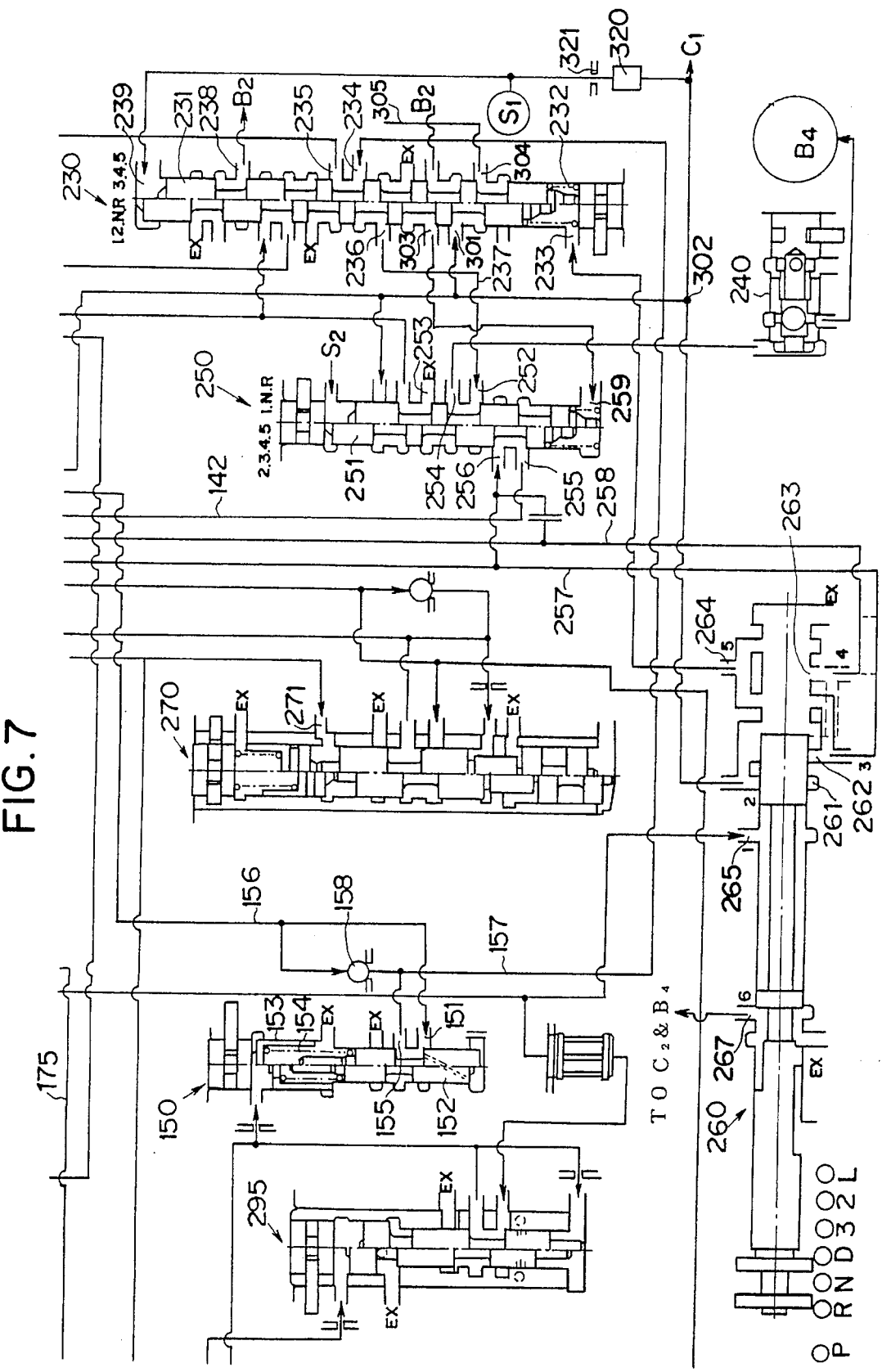
FIG. 7 is a diagram showing a portion of the hydraulic circuit shown in FIG. 4.

In FIG. 7, the coast brake control valve 150 has its input port 151 connected with an oil line 156, which in turn is connected with the port 133 of the aforementioned B2 release control valve 130, and its output port 155 connected with an oil line 157 for outputting a regulated brake pressure to the first brake B1 or the fourth brake B4. Moreover, these oil lines 156 and 157 are connected with each other through an orifice 158 having a check ball, which is opened when the pressure is released from the first brake B1 or the fourth brake B4.

Both the control for changing the destination of the brake pressure to the first brake B1 or the fourth brake B4 and the control for feeding the D-range pressure to the hold port 108 of the 3–4 shift valve 100 are effected by a 2–3 shift valve 230. This 2–3 shift valve 230 is a valve for changing the communicating states of its ports by a spool 231 having seven lands. The 2–3 shift valve 230 is equipped at its one end side with a spring 232 and is fed with the L-range pressure at its hold port 233 opened at the end portion of the spring 232.

The oil line 157 for feeding the brake pressure communicates with a port 234 of an intermediate portion, and an output port 235, as located above the port 234 in FIG. 7, is connected with the input port 106 of the aforementioned 3–4 shift valve 100. On the other hand, a second output port 236, as located below the port 234 in FIG. 7, is connected with a 1–2 shift valve 250 via an oil line 237. Moreover, the first solenoid valve S1 is connected with a control port 239 which is opposed to the hold port 233 across the spool 231.

This first solenoid valve S1 is a normal open type solenoid valve which has its drain port closed, when in its OFF state, and opened when in its ON state, so that it applies the D-range pressure, which is fed through the strainer 320 and the orifice 321, to the control port 239 when in its OFF state and releases it when in its ON state. As a result, when the L-range pressure is not applied to the hold port 233, the 2–3 shift valve 230 is controlled by the first solenoid valve S1. Moreover, this 2–3 shift valve 230 is constructed to have its spool 231 raised to the position, as indicated at the lefthand half of FIG. 7, at the 1st and 2nd speeds and in the N-range and the R-range and lowered to the position, as indicated at the righthand half of FIG. 7 at the 3rd to 5th speeds.

As a result, in the case of effecting the engine braking at the 1st speed, the port 234 is opened to communicate with the second output port 236 to output the brake pressure. In the case of effecting the engine braking at the 3rd speed, on the other hand, the port 234 is opened to communicate with the output port 235 to feed the brake pressure to the first brake B1 through the 3–4 shift valve 100. Incidentally, the second brake B2 is connected with a port 238. Moreover, the 2–3 shift valve 230 is equipped with a D-range pressure input port 301 to be fed with the D-range pressure, and this input port 301 is connected with an oil line 302. This 2–3 shift valve 230 is formed with a first D-range pressure output port 303 and a second D-range pressure output port 304 above and below of that port 301. Moreover, this D-range pressure input port 301 is opened to communicate with the first D-range pressure output port 303, as located at the upper side of FIG. 7, at the 3rd to 5th speeds and with the second D-range pressure output port 304, as located at the lower side of FIG. 7, at the remaining gear stages and in the N-range and the R-range. On the other hand, this second D-range pressure output port 304 is connected via an oil line 305 with the hold port 108 of the aforementioned 3–4 shift valve 100. This D-range pressure is an oil pressure to be built up in the oil line in a forward range including the D-range, as described hereinafter, so that the D-range pressure is fed at the 1st and 2nd speeds through the 2–3 shift valve 230 to the hold port 108 of the 3–4 shift valve 100.

The fourth brake B4 to be applied for effecting the engine braking at the 1st speed is connected with the 1–2 shift valve 250 through a shuttle valve 240. This 1–2 shift valve 250 is a valve for changing the communicating states of its ports by a spool 251 having four lands. The second output port 236 of the aforementioned 2–3 shift valve 230 is connected with an input port 252, and the shuttle valve 240 is connected with an output port 254 which is selectively opened to communicate with that input port 252 and a drain port 253.

On the other hand, the oil line 142 for feeding the engine braking range pressure to the aforementioned B2 release control valve 130 is connected with another output port 255. With an engine braking port 256 to be selectively opened to communicate with that output port 255, there are connected an oil line 257 for feeding a "3"-range pressure and an oil line 258 for feeding a "2"-range pressure. In the portion in which is arranged a spring for urging the spool 251 in its axial direction, moreover, there is formed a hold port 259 which is connected with the first D-range pressure output port 303 of the aforementioned 2–3 shift valve 230. On the other hand, the second solenoid valve S2 is connected with the control port which is opposed to that hold port 259.

As a result, the spool 251 of this 1–2 shift valve 250 is lowered to the position, as indicated at the righthand half of FIG. 7, at the 1st speed and in the N-range and the R-range. In this state, therefore, the input port 252 is opened to communicate with the output port 254. At the 2nd to 5th speeds, on the other hand, the spool 251 is raised to the position, as indicated at the lefthand half of FIG. 7, so that the engine braking port 256 is opened to communicate with the other output port 255. Incidentally, the remaining oil lines have such connected states as are shown in FIG. 7.

Here will be described a manual valve 260. This manual valve 260 is a valve which can be manually operated to set seven positions, i.e., a parking (P) range, an R-range, an N-range, a D-range, a "3"-range, a "2"-range and an L-range. An input port 265 connected with a line pressure oil line PL is opened to communicate with the ports which are formed to correspond to the individual ranges other than the P-range. In case the N-range is set, the remaining portions are shut off from the input port 265, as shown in FIG. 7. In case the D-range is set, on the other hand, the D-range pressure is outputted from a D-port 261. In case the "3"-range is set, on the other hand, the oil pressure is outputted from the D-port 261 and a "3" port 262, and this oil pressure to be outputted from the "3" port is the so-called "3"-range pressure. In case the "2" range is set, on the other hand, the oil pressure is outputted from the D-port 261, the "3" port and a "2" port 263. This oil pressure to be outputted from the "2" port 263 is the "2"-range pressure.

Incidentally, the D-port 261 is opened to communicate to the first clutch C1, and the aforementioned oil line 257 is connected with the "3" port 262 whereas the aforementioned oil line 258 is connected with the "2" port 263. In case the L-range is set, moreover, the oil pressure is outputted from the D-port 261, the "3" port 262, the "2" port 263 and an L-port 264, and the oil pressure outputted from this L-port is fed to the hold port 233 of the aforementioned 2–3 shift valve 230.

In case the R-range is set, on the other hand, the input port 265 is opened to communicate with an R-port 267, from which is outputted the R-range pressure. With this R-port 267, there are connected not only the shuttle valve 240 and the fourth brake B4 through the reverse control valve, although not especially shown, but also the not-shown other shuttle valve and the second clutch C2. If, therefore, the R-range is set by the manual valve 260, those second clutch C2 and the fourth brake B4 are applied without any conducting states of the solenoid valves S1, S2, S3 to establish the reverse stage in the main transmission unit 32. Incidentally, the input port 265 is shut off in case the P-range is set.

On the other hand, reference numeral 270 appearing in FIG. 7 designates a B3 control valve which changes a pressure regulating level by feeding the signal pressure of the linear solenoid valve SLU, which is fed through the solenoid relay valve 210, to the control port 271 thereby to control the oil pressure to be fed to the third brake which is applied when the 2nd speed is set. This construction of the B3 control valve 270 is known in the prior art so that its description will be omitted by showing the connected states of the main oil lines in FIG. 7.

Incidentally, the aforementioned C0 exhaust valve 190 is a valve for controlling the clutch C0 of the auxiliary transmission unit 31 and is caused to close a first input port 192 to be fed with the line pressure PL at the 1st to 4th speeds, by having its first control port 191 fed with the oil pressure at the 2nd speed of the D-range. At this time, moreover, a second input port 193 to be fed with the "2"-range pressure is opened to communicate with an output port 194. At the 2nd speed of the D-range, therefore, no oil pressure is outputted to release the clutch C0. In the "2"-range and the L-range, moreover, the "2"-range pressure is fed to the second input port 193 so that the clutch C0 is applied to effect the engine braking. Moreover, a second control port 195 is fed with the signal pressure of the linear solenoid valve SLU.

Figure 8:
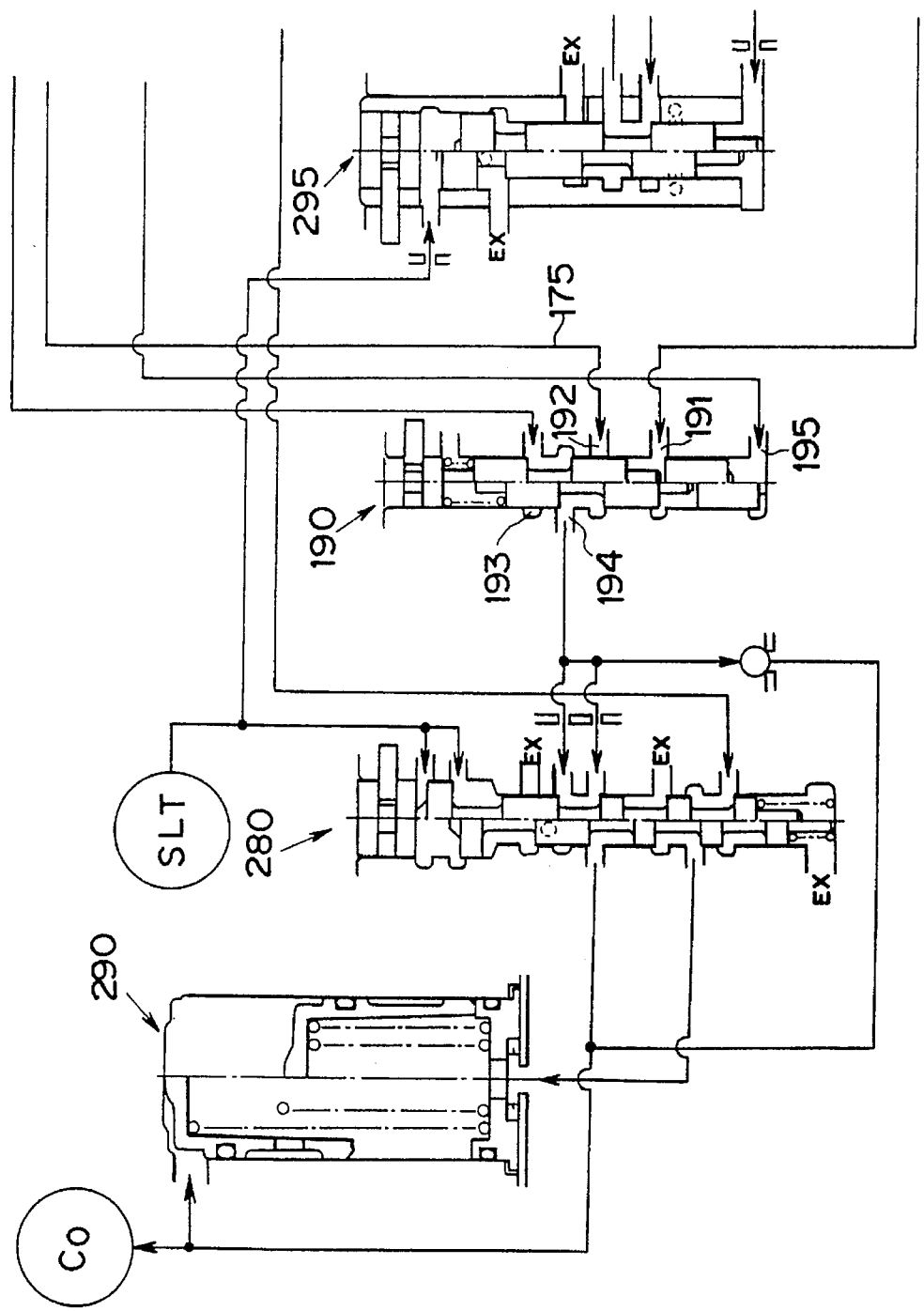
FIG. 8 is a diagram showing another portion of the hydraulic circuit shown in FIG. 4.

Incidentally, reference numeral 280 appearing in FIG. 8 designates a relay valve to be controlled by the linear solenoid valve SLT, and numeral 290 designates an accumulator. Moreover, numeral 295 designates an accumulator control valve for regulating the accumulator back pressure PACC.

Figure 9:
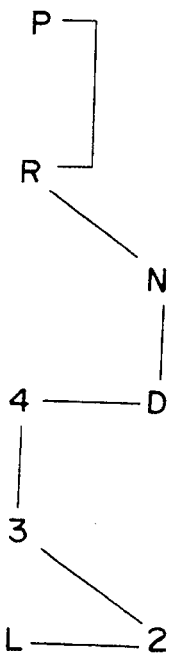
FIG. 9 is a diagram showing still another portion of the hydraulic circuit shown in FIG. 4.

Here will be further described the shift unit for selecting one of the ranges. What is adopted in the present embodiment is the shift unit of the shift pattern which has its range positions arrayed, as shown in FIG. 9. This array will be briefly described in the following. The reverse (R) range position is arranged subsequent to the parking (P) range position, and the neutral (N) range position is positioned subsequent to the R-range and at an inclination with respect to the array direction. The drive (D) range position is arranged in parallel with the array direction of the aforementioned P-range position and R-range position with respect to that N-range, and the "4"-range position is folded and arranged at a right angle with respect to the array direction of the N-range position and the D-range position. Moreover, the "3"-range position is arranged in parallel with the array direction of the aforementioned N-range position and D-range position with respect to the "4"-range position. The "2"-range position is positioned to take a relation similar to that of the N-range position relative to the aforementioned R-range position. Moreover, the low (L) range position is positioned to take a relation similar to that of the "4"-range position relative to the D-range position.

Of these running ranges, the D-range can achieve the forward five stages, as shown in FIG. 3. On the other hand, the "4"-range can achieve the forward four stages excepting the overdrive stage for the 5th speed. Moreover, the "3"-range can achieve the gear stages to the 3rd speed, and the "2"-range can achieve the gear stages to the 2nd speed. Still moreover, the L-range can achieve only the 1st speed.

In order to detect the aforementioned individual range positions or to decide a failure, there are provided two sets of switches, as have been disclosed in detail in Japanese Patent Laid-Open No. 306764/1993. These switches will be briefly described in the following. Six switches are arrayed in parallel with the array direction of the P-range position and the R-range position or the N-range direction and the D-range direction. Specifically, this array direction is oriented longitudinally of the vehicle such that the six switches are arrayed with the foremost one corresponding to the P-range position and with the remaining five ones respectively corresponding to the R-range position, the N-range position, the D-range position, the "3"-range position and the "2"-range position backward in the recited order. Three switches are provided as the other set. Specifically, these switches correspond to the P-range position, the "4"-range position and the L-range position.

These switches are connected with the aforementioned transmission electronic control unit 10 so that logical ORs are taken between the output signals of the first set of six switches and the output signals from the second set of three switches to decide a selected range position (or shift position) and a failure.

According to the aforementioned control system, the ON patterns of the shift solenoid valves S1, S2 and S3 for setting the reverse stage and the ON patterns of the shift solenoid valve S1, S2 and S3 for setting the 1st speed of the D-range are identical. First of all, the 1st speed of the D-range will be described in the following. The D-range pressure is built up by setting the D-range by the manual valve 260. As seen from the application chart of FIG. 3, the first clutch C1 is applied at all times in the forward ranges. Specifically, the D-range pressure is sent to the first clutch C1. In this state, the first solenoid valve S1 is turned ON to output no signal pressure, but the second and third solenoid valves S2 and S3 are turned OFF to output their individual signal pressures.

As a result, the 2–3 shift valve 230 has its control port 239 fed with no signal pressure so that its spool 231 is raised to the position, as indicated at the lefthand half of FIG. 7. Specifically, the D-range pressure input port 301 is opened to communicate with the second D-range pressure output port 304 so that the D-range pressure fed from the oil line 302 is fed to the hold port 108 of the 3–4 shift valve 100 via those ports 301 and 304 and the oil line 305.

At the 1st speed of the D-range, the 3–4 shift valve 100 has its control port 109 fed with the signal pressure of the second solenoid valve S2, but its spool 104 is raised to the position, as indicated at the lefthand half of FIG. 6 because the axial force acting upon the spool 104 is effected by the D-range pressure and the spring force rather than by-the signal pressure of the second solenoid valve S2. As a result, the port 101 being fed with the signal pressure of the third solenoid valve S3 is opened to communicate with the port 102 so that this signal pressure is fed to the hold port 131 of the B2 release control valve 130. As a result, the port communicating with the control port 171 of the 4–5 shift valve 170 is opened to communicate with the drain so that the oil is drained from the control port 171 of the 4–5 shift valve 170.

As a result, the 4–5 shift valve 170 has its spool 176 raised to the position, as indicated at the lefthand half of FIG. 6, so that its brake port 173 is opened to communicate with the drain thereby to release the brake B0 communicating with the drain. Since the input port 172 communicates with the output port 174, on the other hand, the line pressure PL is fed therefrom to the clutch C0 through the C0 exhaust valve 190 and the relay valve 280 to apply the clutch C0. In short, the auxiliary transmission unit 31 takes the low gear stage (i.e., the directly connected state). Incidentally, the second clutch C2 is released because it employs the brake range pressure as its initial pressure. Moreover, the brakes B1 to B4 in the main transmission unit 32 are released.

Of these brakes, the fourth brake B4 for setting the engine braking state at the 1st speed will be described in the following. A the 1st speed of the D-range, the third solenoid valve S3 is turned OFF to input its signal pressure through the 3–4 shift valve 100 to the control port 131 of the B2 release control valve 130. As a result, the B2 release control valve 130 has its spool 132 raised to the position, as indicated at the righthand half of FIG. 4 or 6, to shut off the port 134 to be fed with the D-range pressure. As a result, the D-range pressure is not fed to the coast brake control valve 150 so that the fourth brake B4 is left released to make the engine braking ineffective. Upon setting the 1st speed of the D-range, therefore, the fourth brake B4 is prevented from being applied, even if the third solenoid valve S3 should be turned OFF by a failure. As a result, no trouble such as the shifting shock will occur at the shifting time from or to the 1st speed.

Incidentally, in the L-range required to effect the engine braking at the 1st speed, the third solenoid valve S3 is turned ON to output no signal pressure so that B2 release control valve has its control port 131 drained. As a result, the spool 132 is lowered to the position, as indicated at the lefthand half of FIG. 4 or 6, so that the D-range pressure is outputted through the port 134 and the port 133 to the coast brake control valve 150, from which is fed the oil pressureto the fourth brake B4 through the 2–3 shift valve 230, the 1–2 shift valve 250 and the shuttle valve 240. In short, the fourth brake B4 can be applied to effect the engine braking.

When the 3rd speed of the D-range is to be set, on the other hand, the third solenoid valve S3 is turned OFF so that the B2 release control valve 130 has its port 134 shut off as in the case of the 1st speed to cut off the D-range pressure. As a result, the first brake B1 is not fed with the oil pressure but is left released so that no engine braking is effected.

In the "3"-range and the "2"-range for effecting the engine braking at the 3rd speed, on the other hand, the third solenoid valve S3 is turned ON so that the B2 release control valve 130 has its control port 131 drained. As a result, the D-range pressure is fed through the port 134 and the port 133 to the coast brake control valve 150. The engine braking pressure thus regulated in this control valve 150 is fed through the 2–3 shift valve 230 and the 3–4 shift valve 100 to the first brake B1 so that the first brake B1 can be applied to effect the engine braking.

In case the third solenoid valve S3 is turned OFF by failure at the 3rd speed in the "3"-range or the "2"-range, the B2 release control valve 130 has its control port 131 fed with the oil pressure. As a result, the D-range pressure input port 134 being fed with the D-range pressure is shut off, but the engine braking range pressure input port 135 being fed with the engine braking range pressure is opened to communicate with the output port 133 so that the engine braking range pressure is fed from the output port 133 to the coast brake control valve 150. As a result, the engine braking pressure thus regulated is fed to apply the first brake B1 so that the engine braking can be effected even if the third solenoid valve S3 should be turned OFF by failure.

Incidentally, in case the engine braking range pressure is to be fed to the engine braking range pressure input port 135 of the B2 release control valve 130, this feeding route passes through the double orifice 136 so that the rise of the oil pressure of the first brake B1 can be damped to avoid the interference between the first brake B1 and the second brake B2.

According to the control system thus far described, the reverse stage and the 1st speed of the D-range can be set by making the conducting states of the solenoid valves S1, S2 and S3 identical. As a result, in case the D-range is decided due to an electric failure while the vehicle is running backward, the conducting states are identical to those at a low speed so that the reverse run can be continued. Since, however, the electronic control unit 10 executes the shift control on the basis of the shift map of the D-range, an upshift to the 2nd speed is decided if the vehicle speed in the reverse running state rises. In this case, the second solenoid valve is switched from OFF to ON to output no signal pressure so that the 3–4 shift valve 100 acting as a changeover valve has its spool 104 raised to the position, as indicated at the lefthand half of FIG. 6. As a result, the signal pressure of the third solenoid valve S3 is outputted not to the control port 171 of the 4–5 shift valve 170 but to the hold port 131 of the B2 release control valve 130 so that the auxiliary transmission unit 31 is changed from a high gear stage to a low gear stage. In short, the downshift is established in the reverse state. In order to eliminate this trouble, the aforementioned electronic control unit is made to perform a special energization control as the aforementioned failure occurs.

Figure 10:
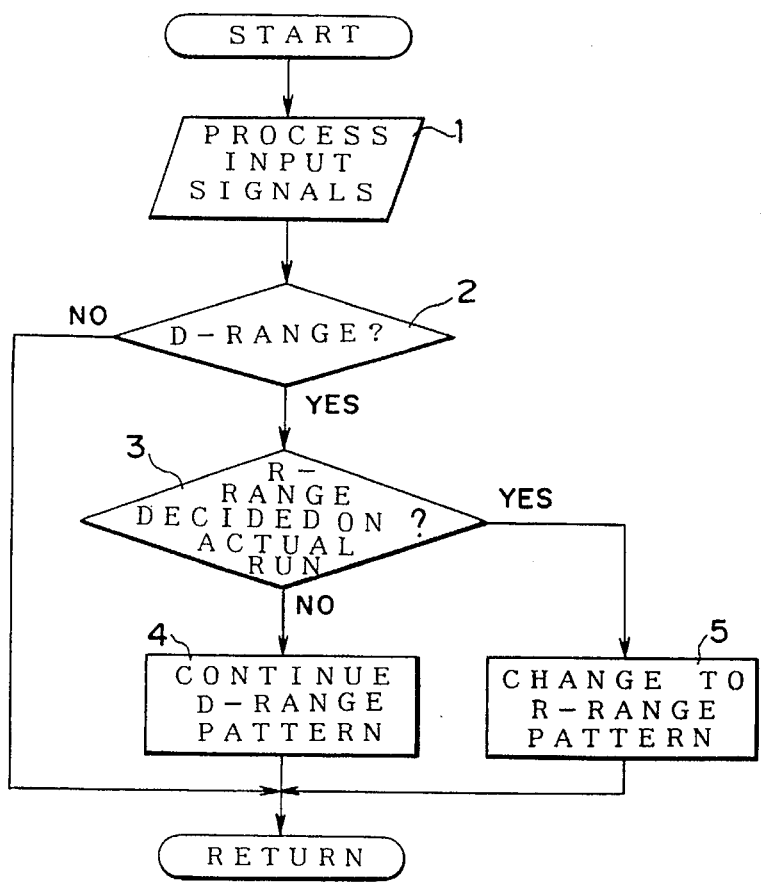
FIG. 10 is a flow chart schematically showing one example of a control routine for changing shift maps at the time of failure.

FIG. 10 is a flow chart for explaining the control routine. After the input signals were processed (at Step 1), it is electrically decided (at Step 2) whether or not the D-range is selected. This decision of Step 2 can be made in the aforementioned shift unit on the basis of the logical ORs of the output signals of the first set of switches and the second set of switches. Specifically, the D-range can be decided if the switches of the first set in the D-range position are ON whereas the switches of the second set are OFF. Incidentally, in the ordinary shift unit for selecting the ranges by moving the shift lever straight, the D-range may be decided from the failsafe standpoint in case none of the shift position switches outputs any signal. In this ordinary case, the D-range can be decided if there is no shift position signal. Incidentally, this Step 2 corresponds to range deciding means in the present invention.

If the answer of Step 2 is NO, the routine is returned. If the answer of Step 2 is YES, on the other hand, it is decided (at Step 3) from the actual run whether or not the vehicle in the R-range. Since the auxiliary transmission unit 31 is set to a high gear stage when at the reverse stage, as described hereinbefore, the sun gear 41 is fixed so that the C0 sensor 82 outputs no signal. Since the reverse stage has a high gear ratio, on the other hand, the RPM of the output shaft 80 is as low as that of the forward first speed. Hence, the reverse stage can be decided if the C0 sensor 82 outputs no signal whereas the vehicle speed sensor 83 detects a low vehicle speed. Alternatively, whether or not the actual run is reverse can be decided by determining the gear ratio from the engine RPM and the RPM of the output shaft 80 and by comparing the determined gear ratio with that of the reverse stage. This Step 3 corresponds to reverse stage detecting means of the present invention.

Figure 11A:
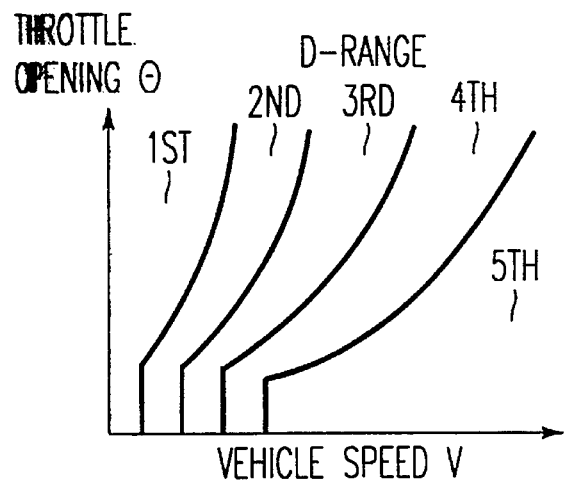
FIG. 11 presents schematic diagrams showing examples of shift maps for the D-range and R-range.
Figure 11B:
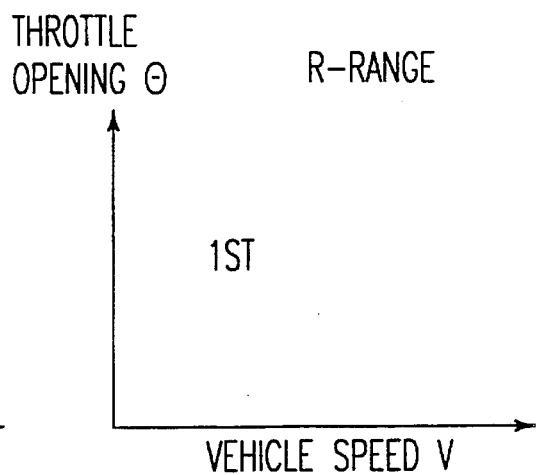

If the answer of Step 3 is NO, it follows that the actual run and the shift position signal are in accord so that no failure occurs. In this case, the shift control in the D-range pattern is continued (at Step 4). This shift control is executed, for example, on the basis of the shift map which is set with the individual shift regions from the 1st to 5th speeds by employing a vehicle speed V and a throttle opening θ as its parameters, as shown in FIG. 11. This execution is not different from the ordinary one of the shift control.

If the answer of Step 3 is YES, on the contrary, there occurs a failure in which the actual run and the shift position signal are inconsistent. In this case, the shift map for the shift control is changed to the R-range pattern (at Step 5). This R-range pattern is exemplified in FIG. 11, in which the first speed region is provided for the entire region employing the vehicle speed V and the throttle opening θ as its parameters. Specifically, the conducting states of the solenoid valves S1, S2 and S3 are fixed identical to that of the first speed of the D-range. Hence, this Step 5 corresponds to energization control means in the present invention.

Thus, the electronic control unit 10 outputs the 1st speed even if the vehicle speed V and the throttle opening θ change, so that the shift solenoid valves S1, S2 and S3 have their conducting states kept to set the 1st speed. These are identical to the conducting states for setting the reverse stage so that the auxiliary transmission unit 31 is held at the high gear stage (i.e., in the overdrive state). As a result, the electronic control unit 10 electrically misjudges the range as the D-range so that no upshift is caused even if the shift control is to be made, namely, so that the auxiliary transmission unit 31 is not changed from the high to low stages. As a result, the downshift in the reverse stage is prevented.

The control described above is exemplified by the case of a failure in which the reverse stage is misjudged as the D-range. Alternatively, the downshift at the reverse stage at the time of a failure, in which the reverse stage is decided as the D-range, can also be prevented by preparing the high and low speed conducting states for the reverse stage setting shift solenoid valves S1, S2 and S3, as will be described in the following.

Figure 13A:
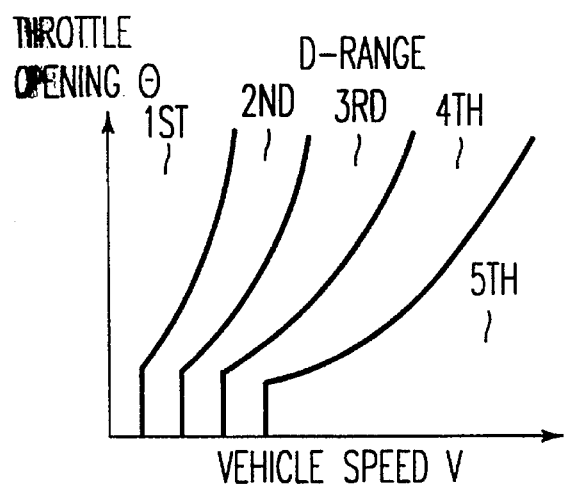
FIG. 13 presents schematic diagrams showing examples of shift maps for the D-range and R-range in accordance with the embodiment.
Figure 13B:
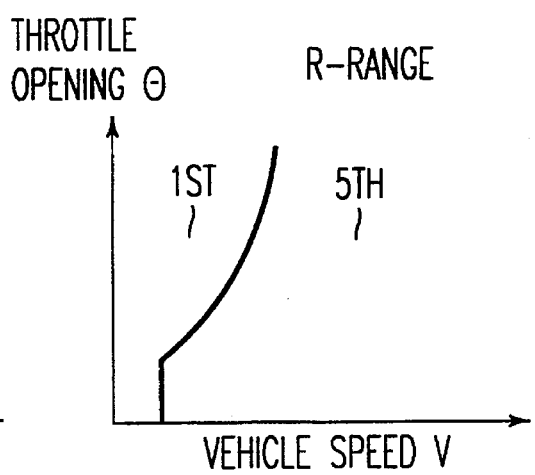

In this embodiment, as shown in the application chart of FIG. 12, conducting states for the high speed and the low speed are prepared for those of the solenoid valves S1, S2 and S3 for setting the rear stage. All of these solenoid valve S1, S2 and S3 are turned OFF in the conducting state for the high speed, whereas only the first solenoid valve S1 is turned ON in the conducting state for the low speed. Specifically, the conducting state for the high speed is identical to that for setting the 5th speed of the D-range, and the conducting state for the low speed is identical to that for setting the 1st speed of the D-range. Moreover, the electronic control unit 10 in this embodiment is equipped with a shift map for the R-range, as shown in FIG. 13, in addition to the ordinary shift map for the D-range, as shown in FIG. 13. In this shift map for the R-range, all the regions at a higher speed side than the shift region of the 1st speed are prepared for the shift region of the 5th speed.

Figure 14:
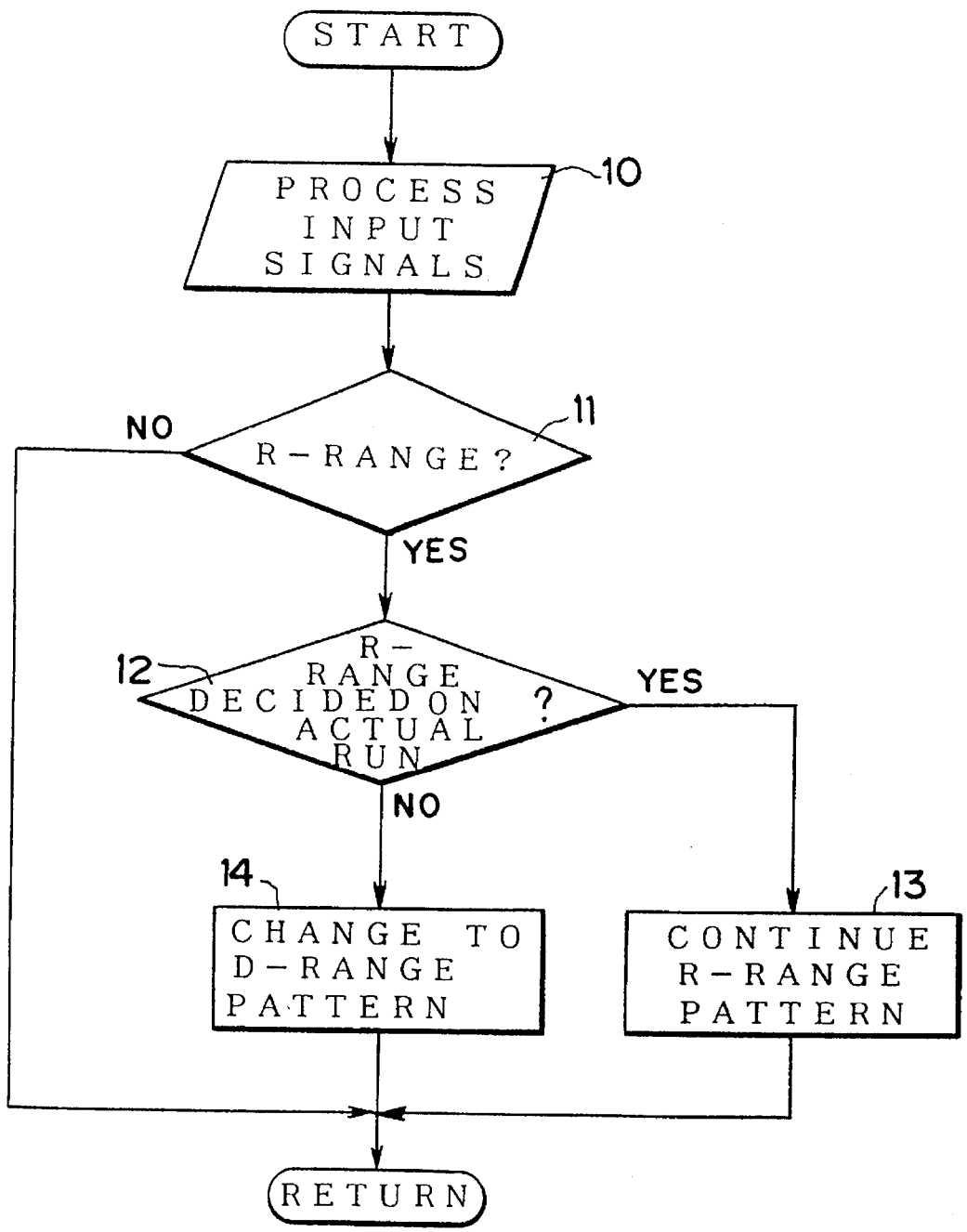
FIG. 14 is a flow chart showing one example of a control routine of the embodiment.
Figure 15:
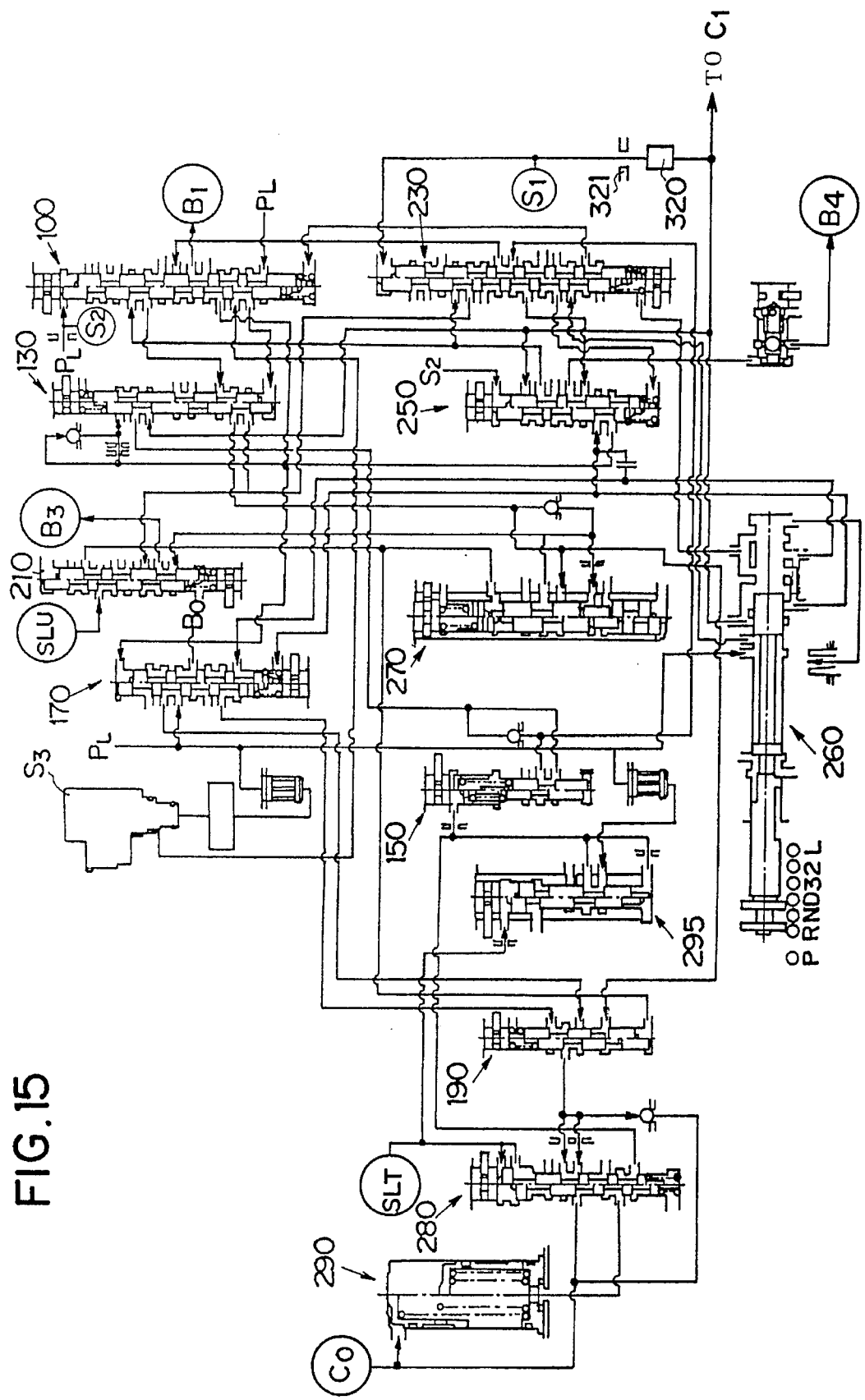
FIG. 15 is a diagram showing a principal portion of the hydraulic circuit of an embodiment which is enabled to output an N-range pressure.

In this embodiment, moreover, the control follows the flow chart of FIG. 14. Specifically, after the input signals were processed (at Step 10), it is decided (at Step 11) on the basis of electric signals whether or not the R-range is set. Incidentally, this Step 11 corresponds to rear stage deciding means in the present invention. The decision of this Step 11 can be made either on the basis of the logic ORs of the output signals of the first switch set and the second switch set in the shift unit, as described hereinbefore, or on the basis of whether or not the switch in the R-range position outputs its signal. If the answer of this Step 11 is NO, the routine is returned. If the answer is YES, on the other hand, it is decided (at Step 12) whether or not the R-range is set on the basis of the actual run. The decision of this Step 12 have the specific content, as has been described hereinbefore.

If the answer of Step 12 is YES, the shift map to be adopted is the aforementioned one for the R-range pattern, as shown in FIG. 13, and the shift control is continued on the basis of the shift map (at Step 13). Specifically, the conducting states of the shift solenoid valves S1, S2 and S3 are made identical to that for setting the 1st speed, if at the low speed, and that for setting the 5th speed of the D-range, if at a speed higher than the 1st speed region. In either event, the second solenoid valve S2 and the third solenoid valve S3 are individually turned OFF so that the auxiliary transmission unit 31 is kept at the high gear stage. Thus, this Step 13 corresponds to rear stage setting means in the present invention.

If the answer of Step 12 is NO, on the contrary, the shift map is changed to the ordinary one for the D-range, as shown in FIG. 13. Thus, even if the R-range is electrically decided, the vehicle is running in the D-range as a matter of fact so that an upshift is effected to the 2nd or 3rd speed as the vehicle speed increases. In other words, in the shift pattern for the R-range, an upshift to the 5th speed would be directly caused by the increase in the vehicle speed. However, this shift to the high gear stage can be prevented by making a change to the D-range pattern. As a result, it is possible to prevent the deterioration of the durability, which might otherwise be caused by an excess slip of the frictional elements. According to the control shown in FIG. 14, moreover, if the R-range is decided although the vehicle runs in the D-range, the R-range pattern is adopted so that the upshift from the 1st to 5th speeds occurs as the vehicle speed increases. In the case of a failure in the decision of the range, what occurs an upshift to the highest gear stage, i.e., the gear stage for raising the auxiliary transmission unit 31 to a high gear stage as the vehicle speed increases. As a result, the torque can be lowered while retaining the run so that the fail-safe run can be ensured. Incidentally, the control shown in FIG. 14 may be continued till the N-range is set.

Incidentally, in the control system of the embodiment described above, the 3–4 shift valve 100 corresponding to the change-over valve of the present invention has its hold port 108 fed with the D-range pressure. In the N-range having no D-range pressure, therefore, no oil pressure acts upon the hold port 108 of the 3–4 shift valve 100. On the other hand, the conducting states of the shift solenoid valves S1, S2 and S3 in the N-range may be controlled to be identical to those for setting the gear stage which is determined on the basis of the vehicle speed and the throttle opening at that instant. This control is to prevent the shift in case the shifting operation is executed between the N-range and the D-range while the vehicle is running. In the case of the aforementioned energization controls of the shift solenoid valves S1, S2 and S3 in the N-range, while the vehicle stands still in the N-range, no oil pressure acts upon the hold port 108 of the 3–4 shift valve, but the signal pressure of the second solenoid valve S2 acts upon the control port 109. Specifically, the 3–4 shift valve 100 has its spool 104 lowered to the position, as indicated at the righthand half of FIG. 6, so that the signal pressure of the third solenoid valve S3 is sent from the port 101 through the port 103 to the control port 171 of the 4–5 shift valve 170. At the stop in the N-range, therefore, the auxiliary transmission unit 31 is set to a high gear stage and is changed to a low gear stage by shifting the shift to the D-range.

At the starting time, much oil has to be fed to the first clutch C1. If the shift control of the auxiliary transmission unit 31 is additionally required, the control for the start is complicated. The construction for eliminating this is shown in FIGS. 15 to 18.

Figure 16:
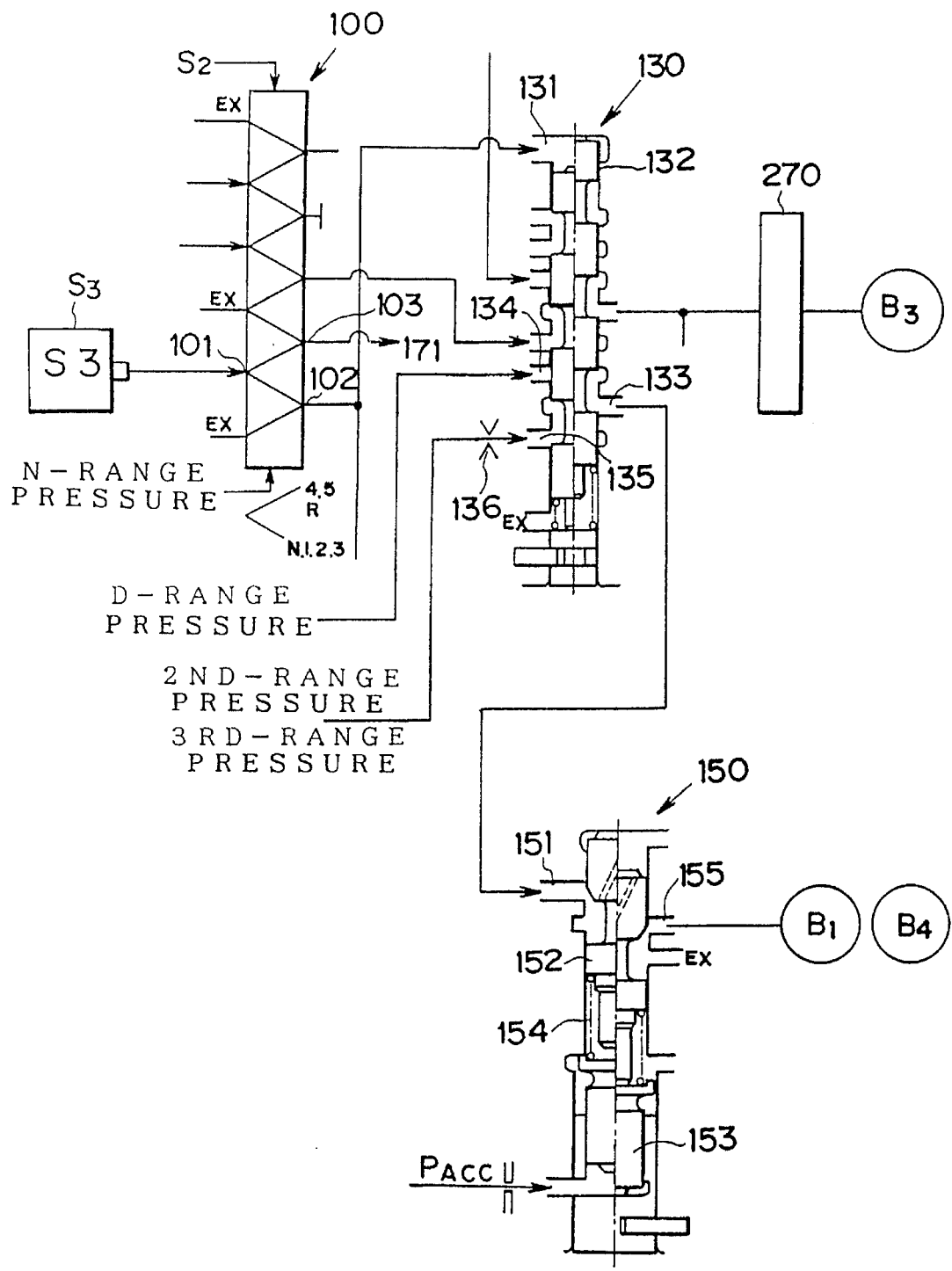
FIG. 16 is schematic hydraulic circuit diagram showing the principal portion of the hydraulic circuit shown in FIG. 15.
Figure 17:
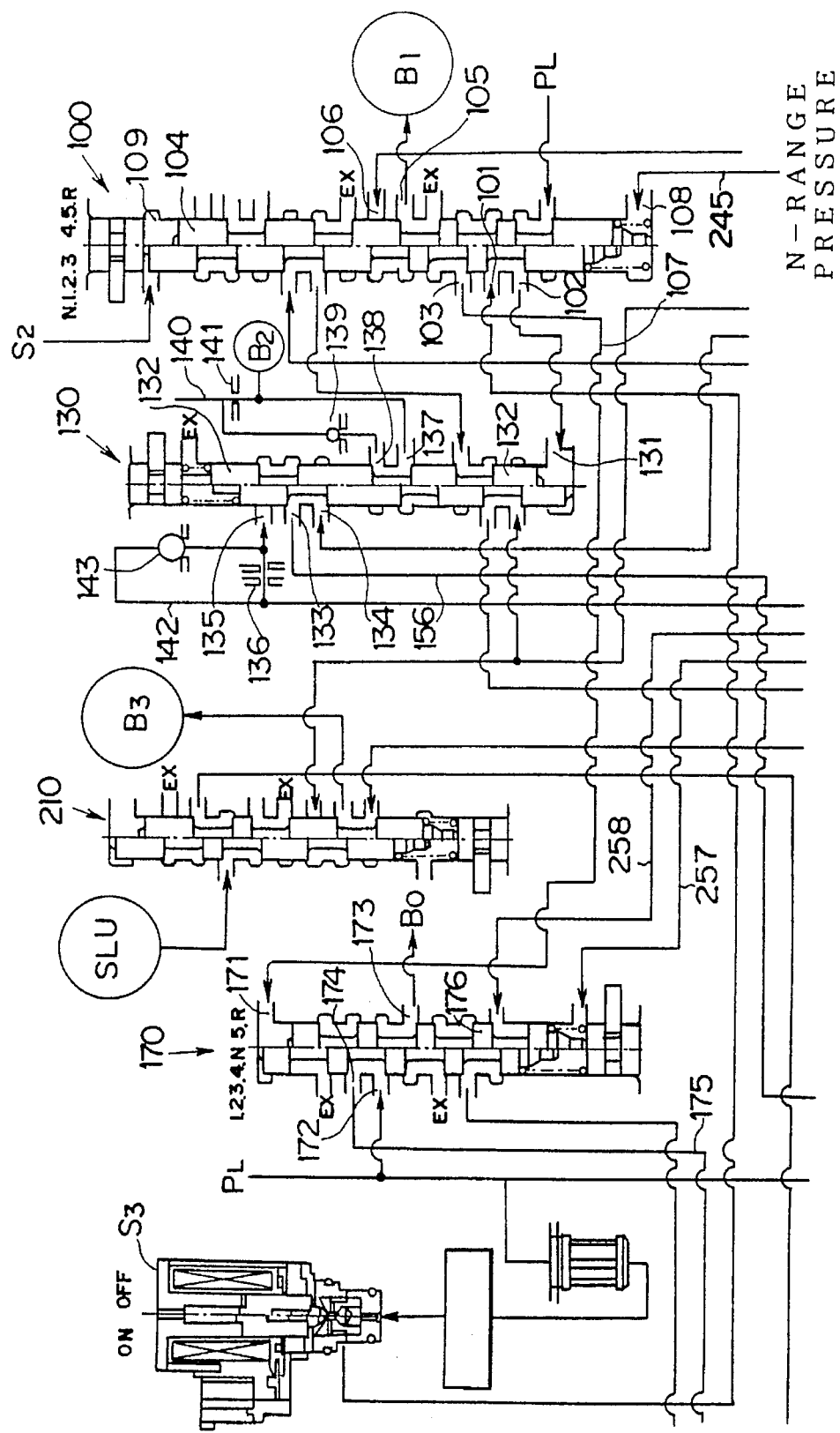
FIG. 17 is an enlarged diagram showing a portion of the hydraulic circuit shown in FIG. 15.
Figure 18:
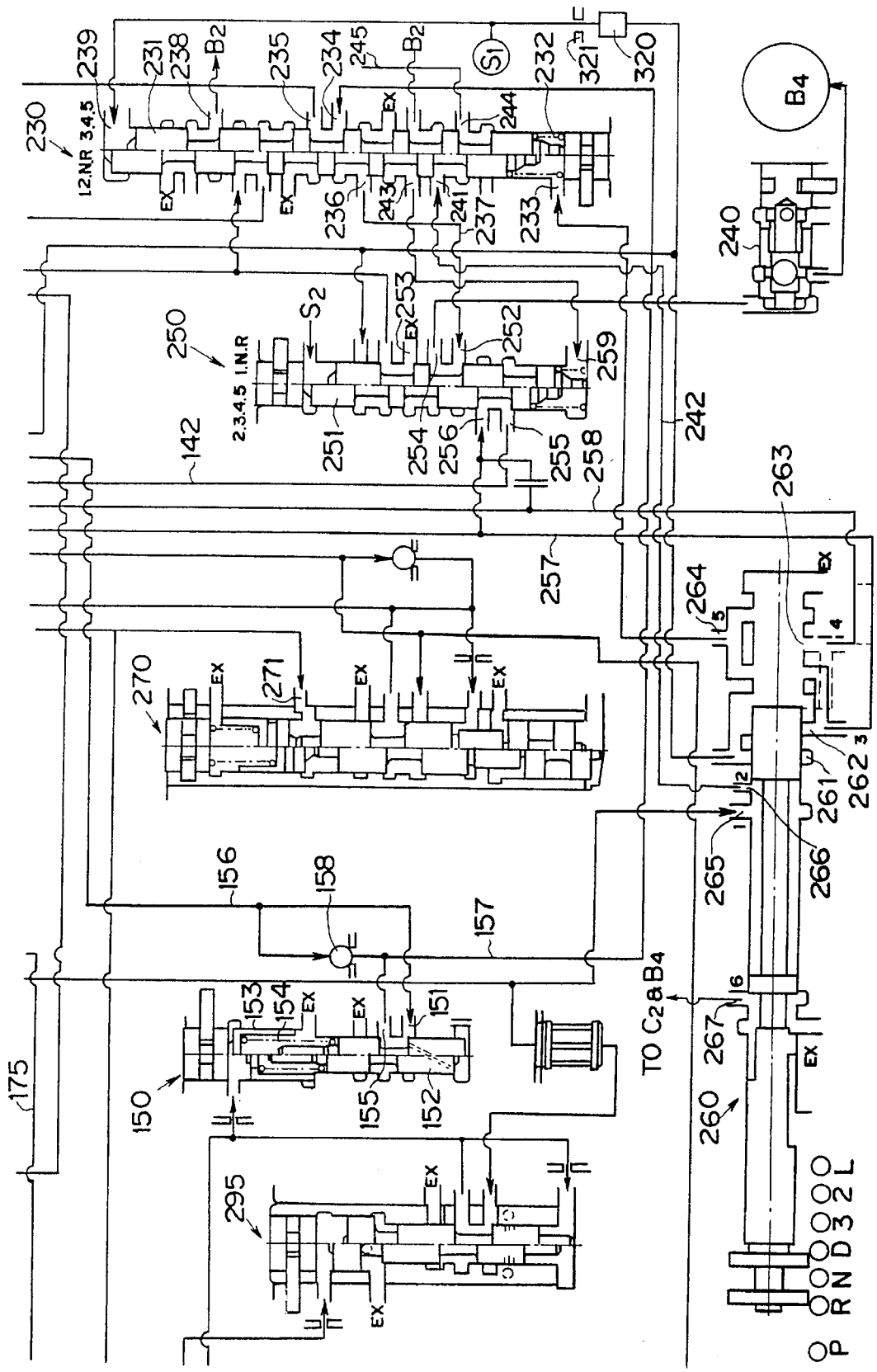
FIG. 18 is an enlarged diagram showing another portion of the hydraulic circuit shown in FIG. 15.

Of these Figures corresponding to FIGS. 4 to 7, FIG. 15 schematically shows a circuit which is improved from the aforementioned hydraulic circuit shown in FIG. 4. Moreover, FIGS. 16 to 18 show the principal portions of the circuit in enlarged scales. Incidentally, the following description is directed mainly to the improved portions, and the portions having been described are designated at the same reference numerals while having their description omitted.

First of all, in the embodiment shown in FIGS. 15 to 18, the manual valve 260 is formed with an N-port 266. This N-port is a port formed between the input port 265 and the D-port 261 and is opened to communicate with the input port 265 in case there is set a range for the forward run including the N-range and the D-range. In case, therefore, a range other than the P-range and the R-range is set, the oil pressure never fails to be outputted from the N-port 265. In other words, an N-range pressure is outputted at any of the N-range, the D-range, the "4" range, the "3" range, the "2" range and the L-range.

Moreover, the aforementioned D-range pressure input port 301 in the 2–3 shift valve 230 is changed to the N-range pressure input port 241, and the communication between this N-range pressure input port 241 and the N-port 265 of the aforementioned manual valve 260 is provided by an oil line 242.

Moreover, the aforementioned first D-range pressure output port 303 is changed to a first N-range pressure output port 243, which is opened to communicate with the hold port 259 of the 1–2 shift valve 250. Moreover, the aforementioned second D-range pressure output port 304 is changed to a second N-range pressure output port 244, which is opened to communicate with the hold port 108 of the 3–4 shift valve 100 via an oil line 245 in place of the aforementioned oil line 305.

As a result, the 3–4 shift valve 100 has its hold port 108 fed with the N-range pressure in place of the D-range pressure so that its spool 104 is raised to the position, as indicated at the lefthand half of FIG. 17, in the N-range and at the 1st to 3rd speeds thereby to cause the port 101 to communicate with the port 102.

Therefore, the embodiment shown in FIGS. 15 to 18 is different from the foregoing embodiment in the oil pressure feeding/releasing states in the N-range. This N-range will be described in the following. In the N-range, the manual valve 260 has its input port opened to communicate with the N-port 266 to output the N-range pressure to the oil line 242. Since, however, the D-range pressure is not outputted in this N-range, the first solenoid valve S1 employing the D-range pressure as its initial pressure outputs no signal pressure so that the 2–3 shift valve 230 has its spool 231 raised, as in the aforementioned cases of the 1st sped and the reverse stage, to the position, as indicated at the lefthand half of FIG. 18. As a result, the N-range pressure input port 241 being fed with the N-range pressure is opened to communicate with the second N-range pressure output port 244 thereby to feed the N-range pressure to the hold port 108 of the 2–3 shift valve 200.

In the N-range, on the other hand, the ON/OFF states of the solenoid valves S1, S2 and S3 are set according to the running states of the vehicle including the vehicle speed and the throttle opening so that the conducting states are usually similar to those of the 1st speed. As a result, the 3–4 shift valve 100 feeds the signal pressure of the third solenoid valve S3, as fed to its port 101, from the port 102 to the hold port 131 of the B2 release control valve 130, as in the aforementioned case of the 1st speed. As a result, the auxiliary transmission unit 31 has its clutch C0 applied and its brake B0 released to establish the low gear stage (or the directly connected state). On the other hand, the main transmission unit 32 is left in the neutral state because the D-range pressure is not built up.

According to the control system thus far described, therefore, the auxiliary transmission unit 31 is set to the low gear stage by building up the N-range pressure in the N-range so that no shift is established in the auxiliary transmission unit 31 in case a shift is made from the N-range to the D-range for starting the vehicle. In other words, the portions of the auxiliary transmission unit 31 to be fed with the oil pressure are not changed according to the shift from the N-range to the D-range so that the control for the start can be facilitated while preventing the shock and the accompanying deterioration of the drive feeling.

The embodiment described above is constructed such that a valve for changing the signal pressure of the third solenoid valve S3 between the control line in the over-drive state and the control line in the engine braking state is employed by the 3–4 shift valve 100, and such that the N-range and the signal pressure of the second solenoid valve S2 are used for that switching operation. In the present invention, however, the N-range pressure may be replaced by the line pressure to control the change of the 3–4 shift valve 100.

Figure 19:
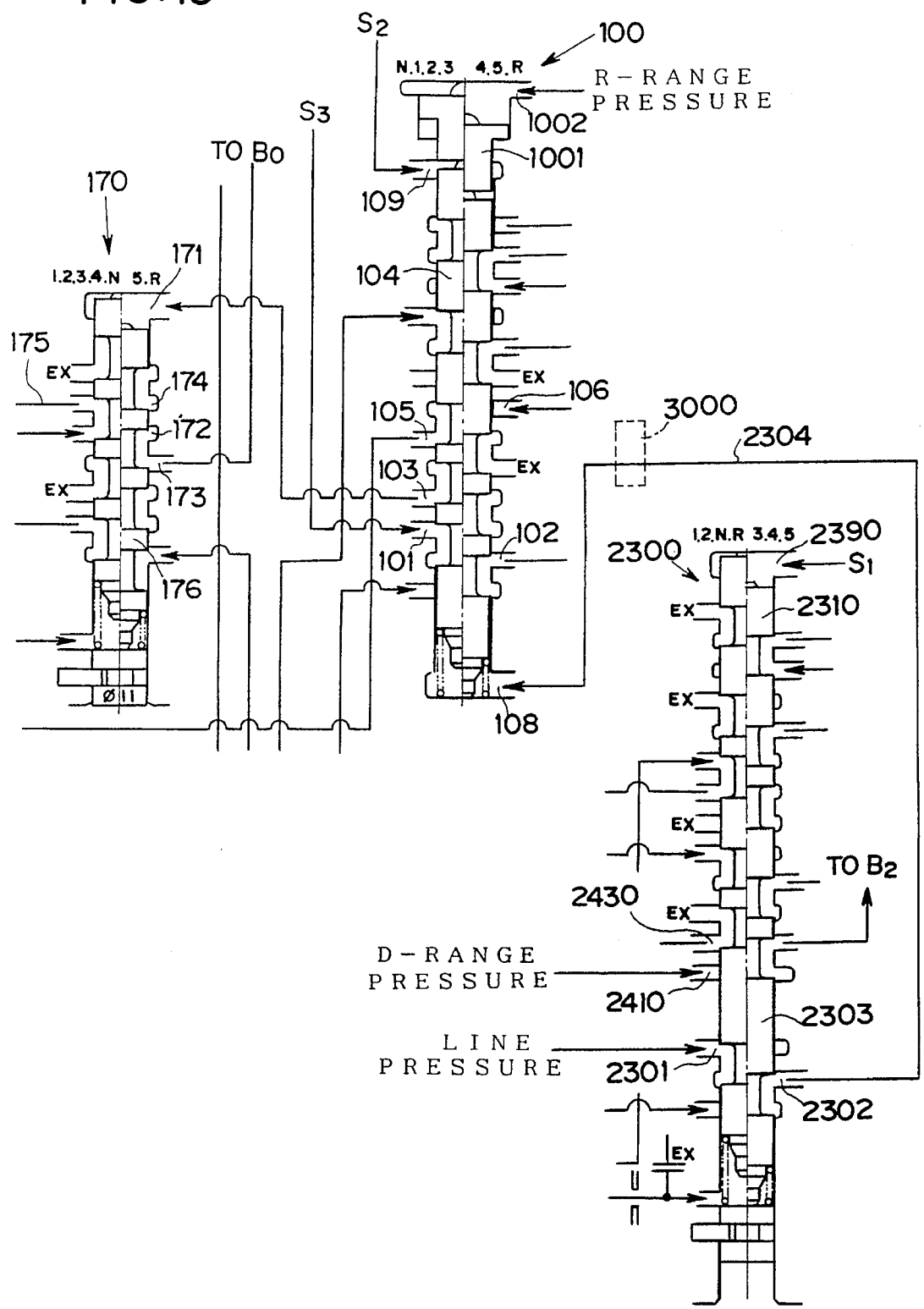
FIG. 19 is a partial hydraulic circuit diagram showing an embodiment which is constructed to use a line pressure in place of the N-range pressure.

This modified embodiment is shown in FIG. 19, in which a 2–3 shift valve 2300 in place of the aforementioned 2–3 shift valve 230 is formed with a line pressure input port 2301 and a line pressure output port 2302 to communicate selectively with the line pressure input port 2301. This line pressure input port 2301 is connected with the line pressure oil line PL and is opened/closed by a predetermined land 2303 of a spool 2301. Specifically, in case the signal pressure of the first solenoid valve S1 is not inputted to a control port 2390 formed at one end side of the spool 2310 so that the spool 2310 is raised to the position, as indicated at the lefthand half of FIG. 19, the line pressure input port 2301 is opened to communicate with the line pressure output port 2302. This line pressure output port 2302 is connected via an oil line 2304 with the hold port 108 of the 3–4 shift valve 100.

Moreover, the 2–3 shift valve 2300 is formed with a D-range input port 2410 to be opened/closed by the aforementioned land 2303. This D-range pressure input port 2410 is opened to communicate with the D-port of the not-shown manual valve. There is also formed an output port 2430 which is selectively opened to communicate with that D-range pressure input port 2410. The second brake B2 is connected with that output port 2430, and communication is established between the D-range pressure input port 2410 and the output port 2430 at the 3rd to 5th speeds, at which the signal pressure of the first solenoid valve S1 is fed to the control port 2390. These D-range pressure input port 2410 and output port 2430 are provided for the reason why the line pressure cannot be commonly used as the oil pressure for applying the second brake At the side of the control port 109 of the 3–4 shift valve 100, on the other hand, there is arranged a plunger 1001 for pushing the spool 104. This plunger 1001 is made sufficiently wide at its end face opposed to the spool 104, and a control port 1002 is formed for applying the oil pressure to that plunger 1001. This control port 1002 is opened to communicate with the R-port of the manual valve so that it is fed with the R-range pressure.

Incidentally, in the embodiment shown in FIG. 19, the manual valve is exemplified by the ordinary manual valve for outputting no N-range pressure, as shown in FIG. 4 or 7.

In the construction shown in FIG. 19, therefore, the first solenoid valve S1 outputs no signal pressure in the N-range so that the 2–3 shift valve 2300 has its spool 2310 raised to the position, as indicated at the lefthand half of FIG. 19. As a result, the communication between the line pressure input port 2301 and the line pressure output port 2302 is provided to feed the line pressure via the oil line 2304 to the hold port 108 of the 3–4 shift valve 100. In the N-range, moreover, the R-range pressure is not built up. As a result, the 3–4 shift valve 100 has its spool 104 raised to the position, as indicated at the righthand half of FIG. 19. Since this operation is similar to that at the 1st speed of the foregoing embodiment, the signal pressure of the third solenoid valve S3 is fed from the port 102 to the B2 release control valve belonging to the engine braking control line. In other words, the signal pressure of the third solenoid valve S3 is not used as the overdrive control signal so that the auxiliary transmission unit 31 is held at the low gear stage. Incidentally, the signal pressure of the third solenoid valve S3 is reversed, as called so, by the B2 release control valve so that the engine braking is not effected. Moreover, this state is identical to that at the 1st speed in the D-range. In the case of a shift from the N-range to the D-range for starting the vehicle, therefore, the auxiliary transmission unit 31 is held at the low gear stage so that the control for the start is facilitated.

Incidentally, in the R-range, this R-range pressure is fed to the plunger control port 1002 of the 3–4 shift valve 100 so that the spool 104 is lowered to the position, as indicated at the righthand half of FIG. 19, by the plunger 1001 even if the hold port 108 is fed with the line pressure. As a result, the signal pressure of the third solenoid valve S3 having been fed to the port 101 is further fed from the port 103 to the 4–5 shift valve 171. This feed is similar to that of the aforementioned case of the reverse stage so that the auxiliary transmission unit 31 has its clutch C0 drained and released but its brake B0 fed with the oil pressure and applied. As a result, the auxiliary transmission unit 31 is set to the high gear stage. According to the construction shown in FIG. 19, the spool 104 of the 3–4 shift valve 100 can be held in the position, as indicated at the righthand half of FIG. 19, independently of the ON/OFF of the second solenoid valve S2, so that the auxiliary transmission unit 31 can be set without fail to the high gear stage even if an electric failure occurs. Another advantage is that the solenoid valves can have their energization patterns shared between the R-range and the D-range.

Incidentally, in the construction shown in FIG. 19, the oil line 2304 may be equipped in its midway with a change-over valve 3000 for cutting off the oil line 2304 selectively. Since this construction makes it unnecessary to provide the 3–4 shift valve 100 with the aforementioned plunger 1001, this 3–4 shift valve 100 can be shortened, and the timing for making a shift from the N-range to the R-range can be controlled by the second and third solenoid valves S2 and S3. Incidentally, it is similar to the foregoing embodiment that the timing of the shift from the N-range to the R-range can be controlled by the second and third solenoid valves S2 and Incidentally, the present invention should not be limited to the foregoing individual embodiments but may be modified such that the solenoid valve for outputting the signal pressure to control the overdrive state and the engine braking can be one other than the aforementioned third solenoid valve. Moreover, the change-over valve for changing the signal pressure to one for either of the aforementioned controls should not be limited to the aforementioned 3–4 shift valve but can be embodied by a suitable valve, if necessary. Still moreover, the valve for reversing the aforementioned signal pressure, as called so, in the engine braking control line to make the engine braking ineffective while the signal pressure is being outputted may be a valve other than the B2 release control valve.

In the foregoing embodiments, furthermore, the 2–3 shift valve and the oil line leading from the former valve to the hold port of the 3–4 shift valve are used as the oil pressure feeding line for actuating the 3–4 shift valve or the change-over valve corresponding to the former, and the oil pressure for feeding the N-range pressure or the like pressure is used as the control line for building up the oil pressure in that oil pressure feeding line. However, the oil pressure feeding line and the control line in the present invention should not be limited to the constructions, as exemplified in the foregoing embodiments.

The advantages to be obtained by the present invention will be synthetically described in the following. According to the control system of the present invention, in the automatic transmission which is constructed such that the control for setting the auxiliary transmission unit to the high gear stage at the reverse stage and the auxiliary transmission unit to the high gear stage and the control for making the engine braking ineffective at the 1st speed of the drive range are effected by the signal pressure of the common solenoid valves, the energization states of the solenoid valves are made common between the reverse stage and the 1st speed of the drive range. As a result, it is possible to avoid the trouble that the auxiliary transmission unit takes the low gear stage at the reverse stage or that the engine braking becomes effective at the 1st speed of the drive range even if the range decision should fail between the reverse stage and the 1st speed of the drive range.

According to the present invention, moreover, in case the drive range is electrically decided when the vehicle is actually running backward, the energization states of the solenoid valves for setting the gear stages are made identical to those of the 1st speed of the drive range. As a result, no upshift is decided according to the rise of the vehicle speed so that the auxiliary transmission unit can be held at the high gear stage during the reverse stage to prevent any shift in advance.

In case the reverse stage is decided, still moreover, the energization states of the solenoid valves are made identical to those at the 1st speed of the drive range and the forward stage for setting the auxiliary transmission unit to the high gear stage in accordance with the vehicle speed. As a result, the auxiliary transmission unit can never fail to be set to the high gear stage at the reverse stage. Even with a failure for deciding the drive range as the reverse stage erroneously, moreover, the gear stage at a higher speed side is set as the vehicle speed rises in the drive range, so that the fail-safe operation can be established while retaining the run and suppressing the torque.

Furthermore, the control system of the present invention is constructed such that the change-over valve for feeding the engine braking control line with the signal pressure for controlling the auxiliary transmission unit and the engine braking state is operated as at the forward 1st speed in the neutral range. As a result, the auxiliary transmission unit need not be subjected to any shift control in the case of a shift from the neutral range to the forward range. In the present invention, therefore, the control at the time of the shift from the neutral range to the forward range can be facilitated to effectively prevent the deterioration of the drive feeling, which might otherwise be caused by the shock.

Even with a failure in the engine braking change-over valve, furthermore, the engine braking frictional elements can be applied by the range pressure of the engine braking range so that the engine braking state can be retained. Furthermore, the system can be made compact by sharing the valves thereby to retain the engine braking state even with a failure of the engine braking change-over valve. Furthermore, the deterioration of the shifting shock can be prevented by controlling the feeding/releasing rates to feed the oil pressure to the frictional elements relating to the shift by means of the orifices to prevent the two frictional elements from simultaneously having a predetermined torque capacity.

What is claimed is:

1. A control system for an automatic transmission including a main transmission unit for setting a reverse stage and a plurality of forward stages and an auxiliary transmission unit connected in series to said main transmission unit and capable to be changed between two higher and lower stages, comprising:

a solenoid valve for outputting a signal pressure when at least said reverse stage and a predetermined one of said forward stages are set;

a change-over valve for changing said signal pressure selectively into a signal pressure for controlling said auxiliary transmission unit and a signal pressure for controlling an engine braking state; and an engine braking control valve for controlling engaged or released states of an engine braking frictional element at said predetermined forward stage on the base of said signal pressure coming from said change-over valve, wherein the acting state of said solenoid valve when said reverse stage is set and the acting state of said solenoid valve when said predetermined forward stage for making the engine braking ineffective is set are identical to each other.

2. A control system according to claim 1, wherein said predetermined forward stage is a 1st forward speed.

3. A control system according to claim 2, further comprising:

another solenoid valve brought into identical acting states at the reverse stage and at the 1st forward speed of a drive range thereby to output a signal pressure for actuating said change-over valve and having its acting state changed according to the rise of a vehicle speed;

range deciding means for deciding a range which is electrically instructed;

reverse stage detecting means for detecting the reverse stage from an actual running state; and energization control means for holding the acting states of said individual solenoid valves identical to the acting state for setting the 1st forward speed of the drive range, when said reverse stage detecting means detects the reverse stage and when said range deciding means decides the drive range.

4. A control system according to claim 3, wherein said energization control means includes means for executing a shift control according to a shift map in which all the regions determined by a plurality of parameter indicating the running state are set as a 1st forward speed region.

5. A control system according to claim 2, further comprising:

another solenoid valve brought into identical acting states at the reverse stage and at the 1st forward speed of the drive range thereby to output a signal pressure for actuating said change-over valve and having its acting state changed according to the rise of a vehicle speed;

still another solenoid valve brought into identical acting states in the reverse stage and at the 1st forward speed of the drive range for outputting a signal pressure to set a gear stage;

reverse stage deciding means for deciding the reverse stage; and reverse stage setting means for making the energization states of said individual solenoid valves identical to the energization state for setting the forward stage, in which said auxiliary transmission unit is at a high gear stage, in case said reverse stage deciding means decides the reverse stage and in case the vehicle speed reaches a predetermined vehicle speed.

6. A control system according to claim 1, further comprising:

a manual valve for selecting at least two ranges, in which the engine braking is effected and not for said predetermined forward stage; and an oil passage for feeding an oil pressure to said engine braking frictional element independently of the acting state of said engine braking control valve in case the range for effecting the engine braking at said predetermined forward stage is set.

7. A control system according to claim 1, further comprising;

a second change-over valve changed by a signal pressure from said change-over valve, wherein said engine braking control valve is changed by outputted pressure of said second change-over valve.

8. A control system according to claim 7, wherein said second change-over valve includes a valve for bringing said engine braking control valve into the engine braking state ineffectively when said solenoid valve is in a conducting/unconducting state for outputting signal pressure, on the other hand, for bringing said engine braking control valve into the engine braking state effectively when said solenoid valve is in a conducting/unconducting state without outputting signal pressure.

9. A control system according to claim 7, wherein said second change-over valve includes a timing valve for setting said predetermined forward stage.

10. A control system according to claim 9, wherein said timing valve includes a release control valve for controlling the pressure drain from a brake engaged at the 3rd forward speed.

11. A control system according to claim 9, wherein said solenoid valve is connected to said timing valve for changing said timing valve by the signal pressure outputted from the solenoid valve.

12. A control system according to claim 1, wherein said engine braking control valve has: a spool actuated according to the acting state of said solenoid valve; a first input port for inputting an oil pressure for setting a forward running state; a second input port for inputting a range pressure for setting a range to effect the engine braking at said predetermined forward stage; and an output port for communicating with either said first input port or said second input port in accordance with the acting position of said spool, and wherein said spool is set to a position for providing the communication between said second input port and said output port in the range, where no engine braking is effected at said predetermined forward stage, and for providing the communication between said first input port and said output port in the range where the engine braking is effected at said predetermined forward stage.

13. A control system according to claim 12, further comprising:

an orifice disposed in the oil passage communicating with said second input port for damping the rate of feeding the oil pressure.

14. A control system according to claim 1, further comprising:

a plurality of other solenoid valves for setting the gear stages, wherein said other solenoid valves have identical acting states at the time of setting the reverse stage and at the time of setting said predetermined forward stage.

15. A control system according to claim 1, further comprising:

an oil feed passage for feeding an oil pressure for actuating said change-over valve so that the signal pressure outputted from said solenoid valve may be replaced by a signal pressure for controlling the engine braking state and outputted; and a control passage for feeding an oil pressure to said feed passage when an neutral range is set.

16. A control system according to claim 15, further comprising:

a range change-over valve for outputting an oil pressure in the neutral range, wherein said feed passage includes an oil passage fed with an oil pressure to communicate with a hold port for holding said change-over valve in a predetermined acting state, and wherein said control passage includes another oil passage for feeding the oil pressure outputted from said range change-over valve when the neutral range is set, and another change-over valve for providing the selective communication of said another oil passage with said oil passage.

17. A control system according to claim 15, wherein said feed passage includes an oil passage fed with an oil pressure to communicate with a hold port for holding said change-over valve in a predetermined acting state, and wherein said control passage includes a line pressure oil passage and another change-over valve for providing the communication of said line pressure oil passage with said oil passage when the neutral range is set.

18. A control system according to claim 1, wherein said solenoid valve outputs said signal pressure without being energized.

19. A control system according to claim 1, wherein said auxiliary transmission unit is disposed in the front side of the main transmission unit in the direction for transmitting power.

20. A control system according to claim 1, further comprising;

a shift valve for changing said auxiliary transmission unit, which is fed with said signal pressure for changing said auxiliary transmission unit.

21. A control system according to claim 1, further comprising;

a manual shift lever, and a manual valve for outputting oil pressure to bring said main transmission unit into the reverse state independently of energization state of the solenoid valve by selecting a reverse range by said manual shift valve.

* * * * *

UNITED STATES PATENT AND TRADEMARK OFFICE
CERTIFICATE OF CORRECTION

PATENT NO. : 5,593,365
DATED : January 14, 1997
INVENTOR(S) : Atsushi TABATA, et al.

It is certified that error appears in the above-indentified patent and that said Letters Patent is hereby corrected as shown below:

On the title page, in Item [75], the second inventor's first name should be:

-- [75] Nobuaki. --

Signed and Sealed this

First Day of April, 1997

Attest:

BRUCE LEHMAN

Attesting Officer

Commissioner of Patents and Trademarks